(12) United States Patent
Tsubouchi et al.

(10) Patent No.: US 11,556,547 B2
(45) Date of Patent: Jan. 17, 2023

(54) DETERMINATION APPARATUS, DETERMINATION METHOD, AND NON-TRANSITORY COMPUTER READABLE STORAGE MEDIUM

(71) Applicant: Yahoo Japan Corporation, Tokyo (JP)

(72) Inventors: Kota Tsubouchi, Tokyo (JP); Shuji Yamaguchi, Tokyo (JP); Hiroaki Taguchi, Tokyo (JP)

(73) Assignee: Yahoo Japan Corporation, Tokyo (JP)

( * ) Notice: Subject to any disclaimer, the term of this patent is extended or adjusted under 35 U.S.C. 154(b) by 0 days.

(21) Appl. No.: 17/197,933

(22) Filed: Mar. 10, 2021

(65) Prior Publication Data
US 2021/0357416 A1    Nov. 18, 2021

(30) Foreign Application Priority Data
Mar. 19, 2020   (JP) .............................. JP2020-050222

(51) Int. Cl.
*G06F 16/2457*   (2019.01)
*G06F 16/248*   (2019.01)

(52) U.S. Cl.
CPC ...... *G06F 16/24575* (2019.01); *G06F 16/248* (2019.01); *G06F 16/24573* (2019.01); *G06F 16/24578* (2019.01)

(58) Field of Classification Search
CPC ......... G06F 16/24575; G06F 16/24573; G06F 16/24578; G06F 16/248; G06F 16/2453; G06Q 30/0251; G06Q 30/0282
See application file for complete search history.

(56) References Cited

U.S. PATENT DOCUMENTS

| | | | |
|---|---|---|---|
| 6,757,670 B1 * | 6/2004 | Inohara | G06F 16/24542 707/999.005 |
| 8,055,655 B1 * | 11/2011 | He | G06F 16/2477 707/727 |
| 10,664,512 B1 * | 5/2020 | He | G06F 16/24578 |
| 11,176,495 B1 * | 11/2021 | Ron | G06Q 30/016 |
| 11,243,992 B2 * | 2/2022 | Zhang | G06F 40/205 |

(Continued)

FOREIGN PATENT DOCUMENTS

| | | |
|---|---|---|
| JP | 2011118759 A | 6/2011 |
| JP | 2014-006757 A | 1/2014 |
| JP | 2019053519 A | 4/2019 |

OTHER PUBLICATIONS

Office Action dated Aug. 31, 2021 from counterpart JP Patent Application No. 2020-050222, 4 pages.

(Continued)

*Primary Examiner* — Jorge A Casanova
(74) *Attorney, Agent, or Firm* — Procopio, Cory, Hargreaves & Savitch LLP

(57) ABSTRACT

A determination device according to the present application has an acquisition unit, a categorization unit, and a determination unit. The acquisition unit acquires the search queries, which have been input by a plurality of input customers who have input a reference query. The categorization unit categorizes the search queries, which have been input in a predetermined period among search queries, into a plurality of categories. The determination unit determines whether a categorization result by the categorization unit satisfies a predetermined determination condition or not.

14 Claims, 11 Drawing Sheets

(56) References Cited

U.S. PATENT DOCUMENTS

| | | | |
|---|---|---|---|
| 2005/0050045 A1* | 3/2005 | Taira | G06F 16/951 |
| | | | 707/999.009 |
| 2010/0179948 A1* | 7/2010 | Xie | G06F 16/9535 |
| | | | 707/706 |
| 2014/0101119 A1* | 4/2014 | Li | G06F 16/3331 |
| | | | 707/706 |
| 2015/0160806 A1* | 6/2015 | Fey | G06F 3/0482 |
| | | | 715/748 |
| 2018/0032579 A1* | 2/2018 | Higuchi | G06F 16/24545 |
| 2018/0181569 A1* | 6/2018 | Jarr | G06F 16/5838 |
| 2020/0184018 A1* | 6/2020 | Lal | G06Q 10/107 |
| 2021/0224337 A1* | 7/2021 | Ballard | G06F 16/951 |

OTHER PUBLICATIONS

Office Action dated Feb. 1, 2022 from counterpart JP Patent Application No. 2020-050222, 4 pages.

* cited by examiner

DETERMINATION APPARATUS, DETERMINATION METHOD, AND NON-TRANSITORY COMPUTER READABLE STORAGE MEDIUM

CROSS-REFERENCE TO RELATED APPLICATIONS

The present application claims priority to and incorporates by reference the entire contents of Japanese Patent Application No. 2020-050222 filed in Japan on Mar. 19, 2020

BACKGROUND OF THE INVENTION

1. Field of the Invention

The present disclosure relates to a determination device, a determination method, and a determination program.

2. Description of the Related Art

As the Internet has become common, various information analysis techniques have been proposed. For example, various query log analysis techniques have been proposed. The query log analysis techniques can be applied to search advertising. For example, in order to present search keyword options of advertisement, analyzing the search queries input by customers has been proposed. However, in the above described technique, there are cases in which it cannot be said that the search queries input by customers are appropriately analyzed.

For example, in the above described technique, the search queries are merely analyzed in accordance with the frequency by which the search queries are input. Therefore, with the above described technique, facts that how customers became to be related to various targets of various events, companies, etc. may not be found out.

The present application has been accomplished in view of the foregoing, and it is an object to more appropriately analyze the relations between customers and a target indicated by a predetermined search query.

SUMMARY OF THE INVENTION

It is an object of the present invention to at least partially solve the problems in the conventional technology.

According to one aspect of the subject matter described in this disclosure, a determination device includes (i) an acquisition unit configured to acquire a search query(ies) input by a plurality of input customers who have input a reference query, (ii) a categorization unit configured to categorize the search queries input in a predetermined period among the search queries into a plurality of categories, and (iii) a determination unit configured to determine whether a categorization result by the categorization unit satisfies a predetermined determination condition or not.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, embodiments of the present disclosure will be described in detail with reference to drawings. Note that the present invention is not limited by the embodiments. Details of one or a plurality of the embodiments are described in the following description and drawings. Also, a plurality of the embodiments can be appropriately combined within a range that does not cause a conflict in processing contents. Also, in following one or a plurality of the embodiments, the same parts are denoted by the same reference signs, and redundant description will be omitted.

1. Exemplary Embodiment

First, with reference to FIG. 1, FIG. 2, FIG. 3, and FIG. 4, an exemplary embodiment of the present disclosure will be described in detail. An information providing device according to the exemplary embodiment executes an information providing process described below to find out a user who has particular needs from time-series search queries.

Hereinafter, with reference to FIG. 1, FIG. 2, FIG. 3, and FIG. 4, the information providing process according to the exemplary embodiment will be described.

1-1. Time-Series Data Providing Process

Figure 1:
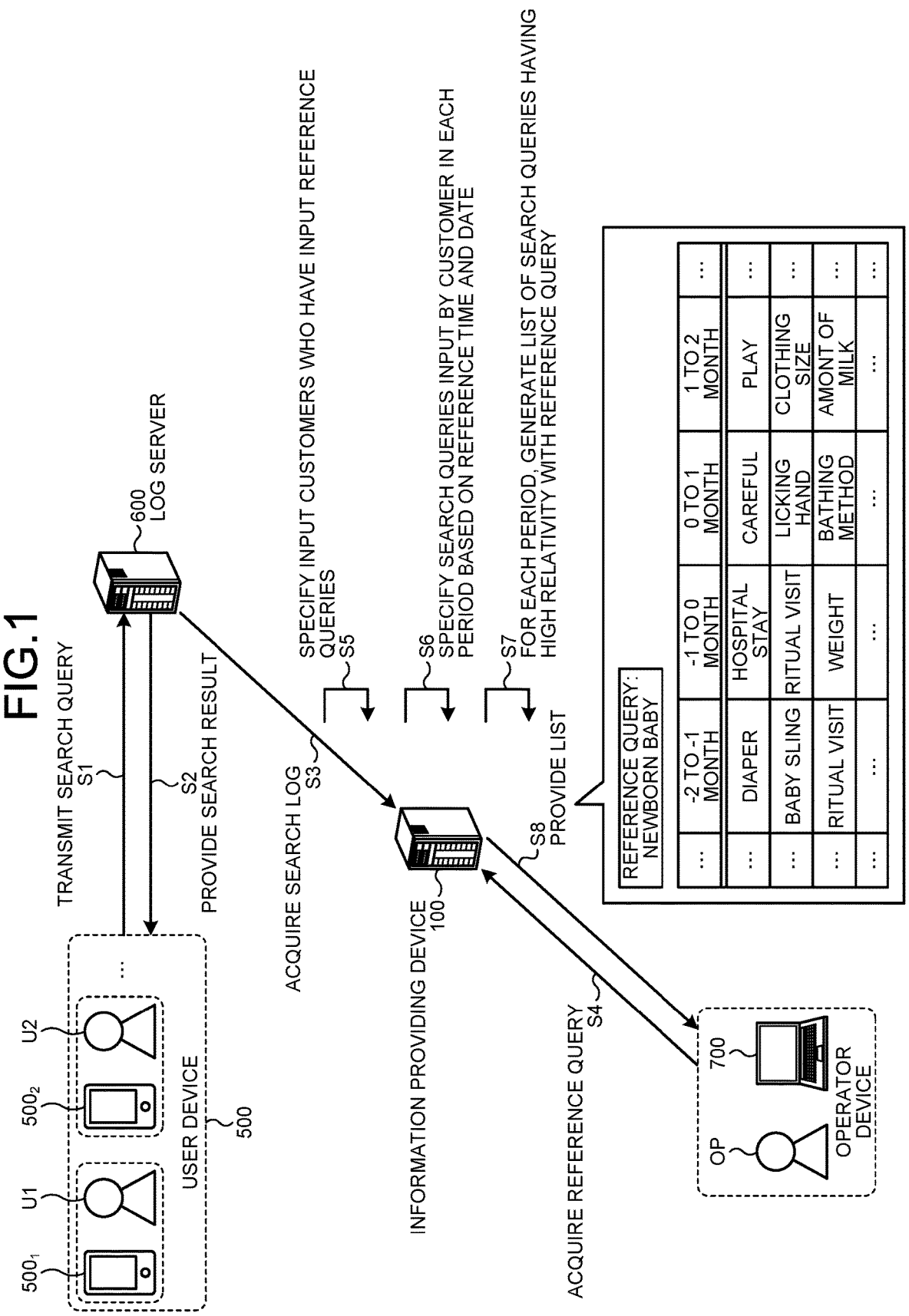
FIG. 1 is an explanatory diagram illustrating an example of a time-series data providing process which provides time-series data of search queries according to an exemplary embodiment of the present disclosure.

FIG. 1 is an explanatory diagram illustrating an example of a time-series data providing process which provides time-series data of search queries according to the exemplary embodiment of the present disclosure. In the exemplary embodiment, the information providing process is carried out by an information providing device 100 illustrated in FIG. 1. The information providing device 100 is an example of a determination device. Although it is not illustrated in FIG. 1, a network such as the Internet (for example, a network N described later with reference to FIG. 5) connects the information providing device 100, user devices $500_1$ to $500_n$ (n is an arbitrary natural number), a log server 600, and an operator device 700 illustrated in FIG. 1.

In the example of FIG. 1, the information providing device 100 is illustrated as a server. In this example, the information providing device 100 provides a history list of search queries to the operator device 700 so that an operator (Operator) OP can specify needs of users (also referred to as "customers") from the history of search queries. The history list of the search queries include, for example, search queries input in each of periods by a target user(s) (also referred to as "target customer(s)"). The target user is a user who has input a predetermined search query at certain time and date. In the present specification, the predetermined search query input at certain time and date may be referred to as "reference query".

In the example of FIG. 1, the user devices $500_1$ to $500_n$ are illustrated as smartphones. For example, the user device $500_1$ is used by a user U1, and the user $500_2$ is used by the user U1. In the present specification, if there is no need to distinguish the user devices $500_1$ to $500_n$, the user devices $500_1$ to $500_n$ are collectively referred to as "user devices 500". In this example, the user U1 and the user U2 are those who use a search service. The user device 500 requests the log server 600 to carry out searches about various information. For example, the user device 500 transmits a search request, which includes a search query, to the log server 600.

In the example of FIG. 1, the log server 600 is illustrated as a server. In this example, the log server 600 provides a search service(s) such as a portal application, a portal site, and/or the like to the users. In response to the search request from the user device 500, the log server 600 provides search results about various information to the user device 500. The log server 600 can accumulate search queries, which are included in search requests, as search logs. The log server 600 can provide the search logs to the information providing device 100.

In the example of FIG. 1, the operator device 700 is illustrated as a laptop personal computer (PC). The operator device 700 is used by the operator OP. The operator OP is, for example, a person of a particular Internet company. In this example, the operator OP provides above described "reference query", which is a predetermined search query, to the information providing device 100 in order to specify needs of the users from the history of search queries. For example, if the target users are the users who have input a search query "newborn baby" at certain time and date, the operator device 700 provides the search query "newborn baby" as a reference query to the information providing device 100. This means that the operator OP wants to specify the needs of such users from the history of the search queries of the users who have input the search query "newborn baby" at certain time and date. For example, it is conceivable that the operator OP wants to know what search query(ies) has been input around (for example, 30 to 60 days after) reference time and date by the user who has input the search query "newborn baby" at the reference time and date (for example, 2020/03/19).

As illustrated in FIG. 1, first, the user device 500 transmits a search query to the log server 600 (step S1).

Then, the log server 600 provides a search result to the user device 500 (step S2).

Then, the information providing device 100 acquires a search log from the log server 600 (step S3). For example, the information providing device 100 collects histories of search queries from the log server 600.

Then, the information providing device 100 acquires a reference query from the operator device 700 (step S4). As described above, the reference query is a predetermined search query input at certain time and date. In the example of FIG. 1, the reference query is a query "newborn baby" input at certain time and date (for example, certain reference time and date).

Then, the information providing device 100 specifies an input customer(s) who have input the acquired reference query (step S5). For example, the information providing device 100 specifies the input customers, who have input the reference query, from the acquired search logs. In the example of FIG. 1, the information providing device 100 specifies users, who have input the search query "newborn baby" at certain time and date, as the input customers. In the present specification, the input customers may be referred to as "input users".

Then, the information providing device 100 specifies search queries input by the customers in periods based on the reference time and date (step S6). The periods based on the reference time and date are the periods around the reference time and date. For example, the interval of the periods may be one month. For example, in a case in which the reference time and date is "2020/03/19", the periods around the reference time and date are the periods after the reference time and date such as "2020/03/19 to 2020/04/19" and "2020/04/19 to 2020/05/19" or the periods before the reference time and date such as "2020/02/19 to 2020/03/19" and "2020/01/19 to 2020/02/19". In the present specification, the period after the reference time and date and the period before the reference time and date may be referred to as a "positive period" and a "negative period", respectively. In this manner, the information providing device 100 extracts the search queries of the users, who have input the reference query, from the acquired search logs in each period based on the reference time and date.

Then, the information providing device 100 generates a list of the search queries, which have high relativity with the reference query, for each period (step S7). The relativity between the reference query and other search queries can be determined based on the relevance degrees between the search queries. For example, the relevance degrees between the search queries can indicate how often a single user inputs these search queries at the same time. For example, if many users input a search query "newborn baby" and a search query "Shichi-go-san (seven-five-three festival)" at the same time, the relevance degree between the search query "newborn baby" and the search query "Shichi-go-san" may be high. In the example of FIG. 1, the information providing device 100 specifies, from the acquired search logs, for example, search queries such as "hospital stay", "ritual visit", and "weight" as the search queries having high relativity with the reference query "newborn baby" one month before the reference time and date. Then, the information providing device 100 generates a list including the specified search queries.

In some implementation modes, the information providing device 100 may determine the relativity between the search queries by using word embedding. The information providing device 100 may obtain embedding vectors by training a language model by using training data including word strings. For example, keywords corresponding to the search queries included in the search logs may be used as the training data including the word strings. The relativity between the search queries may be cosine similarity between the embedding vectors corresponding to the search queries.

Then, the information providing device 100 provides the generated list to the operator device 700 (step S8). In the example of FIG. 1, the generated list illustrates the search queries which have high relativity with the reference query "newborn baby" for each period. As illustrated in FIG. 1, each period is the period around the reference time and date. For example, a period "−1 to 0 month" is a one-month period before the reference time and date. Also, for example, a period "0 to 1 month" is a one-month period after the reference time and date. The generated list illustrates the search queries which have been input by the users, who have input the reference query at the reference time and date, and have high relativity with the reference query in the periods around the reference time and date. In the example of FIG. 1, for example, the search queries which have been input by the users, who have input the reference query "newborn baby" at the reference time and date (for example, "2020/03/19"), and have high relativity with the reference query "newborn baby" in the period "−1 to 0 month" (for example, the period "2020/02/19 to 2020/03/19") are search queries such as "hospital stay", "ritual visit", and "weight".

Note that the vertical-direction order of the list may illustrate the degree of the relativity between the reference query and the other search queries. For example, the relevance degree between the reference query "newborn baby" and the search query "hospital stay" may be higher than the relevance degree between the reference query "newborn baby" and the search query "ritual visit". The information providing device 100 may generate a table in which other search queries input in each period are arranged in the order of relevance degrees and provide the generated table to the operator device 700 as a list.

1-2. Grouping Evaluation Process

If the list of the search queries is generated simply based on the relativity between the reference query and other search queries, the context (also referred to as "relation") of the reference query may be dispersed. The term "context of the reference query" represents the context of input of the reference query, the background of input of the reference query, the circumstances in which the user who has input the reference query is in, the behavior pattern, interest, or concern of the user who has input the reference query, etc.

For example, in a case in which the reference query is a company C1 (exemplary company name), users who have input this reference query include, for example, users who like the company president of the company C1, the users who like a mascot of the company C1, the users who want to change a model of a mobile phone of the company C1, users who want to go to an amusement park run by the company C1, and users who use a comics (manga) browsing service provided by the company C1. In such a case, the context of the reference query is different depending on the user. Therefore, the search queries included in the generated list may vary. For example, the generated list may include search queries such as "company president P1 (exemplary name of a person)", "that dog (exemplary mascot name)", "smartphone SP1 (exemplary smartphone name)", "country of dreams and magic (exemplary name of facilities)", and "that pirate (exemplary comics name)". It is sometimes difficult for the operator OP to extract useful information (for example, typical needs of users) from the generated list if the context of the reference query is dispersed. In addition, the operator OP may not be able to appropriately find out the transition of the needs of the users from the time series of the search queries included in the generated list.

Therefore, the information providing device 100 groups the search queries, which have been input in each period by target users, in order to enable the operator OP to appropriately evaluate the list of the search queries. The information providing device 100 can group the search queries, which have been input in each period, based on the context of the reference query. For example, the information providing device 100 acquires the search logs of the users, who have input the reference query, for each time series (for example, period around the reference time and date). Then, the information providing device 100 groups the search queries for each time series. For example, if the number of groups or the number of the users who have input the search queries related to groups satisfies a threshold value, the information providing device 100 extracts the search queries related to the groups as the search queries included in the list. As a result, the grouped search queries included in the list can have coherence, thereby enabling the operator OP to appropriately evaluate the list of the search queries.

Figure 2:
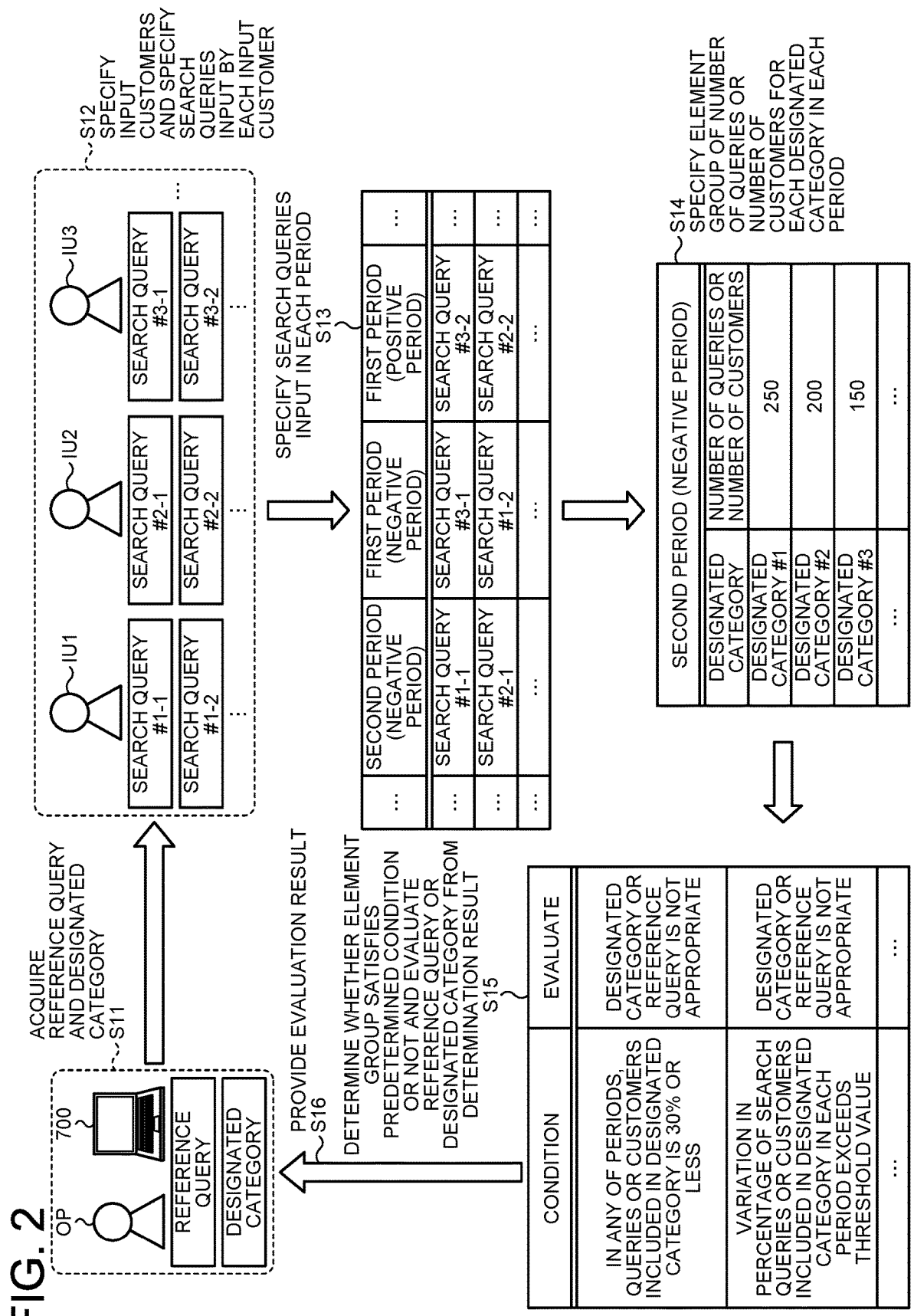
FIG. 2 is an explanatory diagram illustrating an example of a grouping evaluation process of evaluating grouping of time-series search queries according to the exemplary embodiment of the present disclosure.

FIG. 2 is an explanatory diagram illustrating an example of a grouping evaluation process of evaluating grouping of time-series search queries according to the exemplary embodiment of the present disclosure.

As illustrated in FIG. 2, first, the information providing device 100 acquires a reference query and designated categories from the operator device 700 (step S11). As described above, the reference query is a predetermined search query (for example, a search query "company C1") input at certain time and date. On the other hand, the designated categories are the categories for grouping the time-series search queries. The information providing device 100 groups the search queries for each time series (for example, the period around the reference time and date) in accordance with the designated categories. The designated categories are designated, for example, in advance by the operator OP. The designated categories are, for example, categories such as company presidents, mascots, model change, amusement parks, comics, and the like. In this manner, the information providing device 100 receives designated categories from the operator OP.

Then, the information providing device 100 specifies input customers and specifies the search queries input by each of the input customers (step S12). As described above, the input customers are the users who have input the reference queries at the reference time and date. The information providing device 100 can specify the input customers from the search logs. Also, the information providing device 100 can specify the search queries, which have been input in the periods around the reference time and date by the input customers, from the search logs. In the example of FIG. 2, search queries input by an input customer IU1 include a search query #1-1 and a search query #1-2. Similarly, search queries input by an input customer IU2 include a search query #2-1 and a search query #2-2, and search queries input by an input customer IU3 include a search query #3-1 and a search query #3-2. For example, the search query #1-1 may be the company president P1. Also, for example, the search query #1-2 may be that dog (exemplary mascot name).

Then, the information providing device 100 specifies the search queries input in each period (step S13). As described above, each period is a period around the reference time and date. In the example of FIG. 2, the periods around the reference time and date include a first period (positive period), a first period (negative period), a second period (negative period), and so on. For example, the first period (positive period) may be the above described period "0 to 1 month", which is a one-month period from the reference time and date. Also, for example, the first period (negative period) may be the above described period "−1 to 0 month", which is a one-month period before the reference time and date. Also, for example, the second period (negative period) may be the above described period "−2 to −1 month", which is a period 2 months before the reference time and date.

Then, the information providing device 100 specifies an element group of the number of queries or the number of customers of each designated category in each period (step S14). The term "element group" may include an array of the values corresponding to the grouped search queries. For example, the element group of time-series search queries may be an array of the numbers of grouped search queries (in other words, the search queries belonging to particular designated categories) in particular time series (for example, periods). Alternatively, the element group of time-series search queries may be an array of the numbers of the users who have input the search queries belonging to each designated category in particular time series. In other words, the element group may be an array of the values of indexes generated by decomposing the search queries by categories. The term "element group" includes, for example, a data element group such as an array of data elements, a distribution of data elements, etc. This data element may include, for example, the number of the search queries belonging to a particular category or the number of the users who have input the search queries belonging to a particular category.

Regarding a display mode of the above described element group, the array of the values of the indexes (for example, the array of the numbers of the grouped search queries in particular time series) can be presented by using a bar graph. For example, the heights in the bar graph represents the numbers of queries or the numbers of users of each designated category in a certain period. The height in the bar graph representing a designated category #1 may be 250, the height in the bar graph representing a designated category #2 may be 200, and the height in the bar graph representing a designated category #3 may be 150.

In the example of FIG. 2, for example, the information providing device 100 specifies the element group of the number of the search queries or the number of the users of each designated category in the second period (negative period). For example, the number of the search queries input in the second period and belonging to the designated category #1 is "250". Alternatively, the number of the users who have input the search queries input in the second period and belonging to the designated category #1 may be "250". The designated category #1 may be a category "company president", or the designated category 21 may be a category "mascot". In this case, the search query "company president P1 (exemplary name of a person)" belongs to the category "company president". On the other hand, the search query "that dog (exemplary mascot name)" belongs to the category "mascot". In this manner, the information providing device 100 can specify the element group of the search queries by counting the number of the search queries, which have been categorized into the designated categories, and the number of the customers who have input the search queries.

Note that, in this exemplary embodiment, the information providing device 100 specifies the element group of the number of queries or the number of customers of each designated category in each period, but is not limited thereto. The information providing device 100 may categorize the search queries into a plurality of categories for each period. The plurality of categories may include a designated category. In other words, the information providing device 100 may group the search queries for each time series in accordance with the categories other than the designated categories. If categories are not fixed in advance (for example, if the information providing device 100 has not acquired designated categories), the information providing device 100 may categorize the search queries in the search logs into a plurality of categories (for example, categories other than designated categories) based on the reference query and the search logs. If the reference query is fixed in advance, the information providing device 100 can search for a category appropriate for this reference query. In other words, the information providing device 100 may determine whether the reference query is appropriate or not based on the category designated in advance or may search for an appropriate category for this reference query based on the reference query designated in advance.

Then, the information providing device 100 determines whether the element group satisfies a predetermined condition or not and evaluates the reference query or the designated category from the determination result (step S15). The predetermined condition is, for example, a condition that "the number of the groups of search queries converges to a particular value (for example, a natural number n)". The groups are, for example, a plurality of categories including a designated category or a category other than the designated category. For example, if the percentage of the search queries belonging to n designated categories with respect to all queries in each period (in other words, all search logs in each period) satisfies a threshold value (for example, 80%) (for example, n is "3"), the information providing device 100 can use the n designated categories as the groups for the list of the search queries. For simplicity, in the example of FIG. 2, it is assumed that the groups are does not include a category other than the designated category. For example, if the number of designated categories is "3" and if these three designated categories include 80% of search queries or customers, the information providing device 100 determines that these three designated categories satisfy the predetermined condition.

Regarding the number of the groups, if the number of the groups is large, the information providing device 100 can determine that the original reference query is not an appropriate query. If the number of groups in a certain period is equal to the number of groups in another period, the information providing device 100 can determine that the original reference query is an appropriate query. The information providing device 100 can determine whether the list of the search queries is appropriate or not based on whether the element group of the number of queries or the number of users is appropriately expressed or not. If the category is fixed in advance (for example, if the category is a designated category), the information providing device 100 can evaluate the element group of the number of queries or the number of users based on the categories and the search logs and, therefore, can specify an appropriate reference query.

In the example of FIG. 2, the predetermined condition is, for example, a condition that "in any of the periods, the queries or the customers included in the designated category is 30% or less". If the element group satisfies this condition, the information providing device 100 determines that the designated category is not appropriate or the reference query is not appropriate. In addition to or alternatively, the predetermined condition may be, for example, a condition that "variation in the percentage of the search queries or customers included in the designated category in each period exceeds a threshold value". If the element group satisfies this condition, the information providing device 100 determines that the designated category is not appropriate or the reference query is not appropriate. In this manner, the information providing device 100 can evaluate the reference query and the designated category by determining whether the element group of the search queries satisfies the predetermined condition or not. If the element group converges, the information providing device 100 can determine that the list of the search queries is appropriate.

As described above, the determination result is used for determining whether the reference query is appropriate or not. For example, if the reference query satisfies the predetermined condition in each period, the information providing device 100 determines that the reference query is appropriate. The information providing device 100 may determine that the reference query is appropriate if the reference query satisfies the condition in the majority of periods. If the reference query does not satisfy the predetermined condition in the periods, the reference query may not be appropriately expressing a desired target of the operator OP.

Then, the information providing device 100 provides the evaluation result to the operator device 700 (step S16). For example, the information providing device 100 provides the information corresponding to the determination result to the operator OP. The information providing device 100 may automatically optimize categories (for example, designated category, the categories other than the designated category) based on the determination result. The information providing device 100 may display, by the operator device 700, a message indicating that the designated category is not appropriate or the reference query is not appropriate. Alternatively, the information providing device 100 may display, by the operator device 700, a message indicating that the search behavior of users is appropriately expressed by decomposing the time-series search queries into the element group of the category. The information providing device 100 can provide a list that satisfies the conditions about the element groups to the operator device 700. The number (for example, "3") of arrays in a certain period may be the same number of arrays in another period. In this case, the operator OP can read transition modes of designated categories from the list. Such designated categories in each period can be paraphrased and applied to analysis of time-series search behavior.

As described above, the information providing device 100 can group the search queries in each period so that the contents of the search queries in each period are not varied. Therefore, the information providing device 100 can provide, to the operator OP, a list of useful search queries which can be used for analysis of particular needs for company presidents, mascots, model change, etc.

Note that the above described designated categories and the categories other than the designated categories may belong to a higher-level category(ies) than these categories. The high-level categories are transition categories described later with reference to FIG. 4. The transition category shows a path to a target shown by a reference query. For example, if, in the order of a category "mascot", a category "comics", and a category "amusement park", search queries respectively corresponding to these categories are input, the transition mode of the categories of this user can be categorized into a transition category "a path from mascot to amusement park via comics". The transition categories will be described below in detail with reference to FIG. 4. The designated category is a lower-level category corresponding to the transition category. In this exemplary embodiment, the information providing device 100 can determine whether the designated category is appropriate or not. Therefore, the information providing device 100 enables the operator OP to appropriately capture the search behavior of the users.

1-3. Time-Interval Modifying Process

The operator OP sometimes does not know how the length of each period based on the above described reference time and date should be set. As described above, the periods based on the reference time and date are the periods around the reference time and date. For example, an appropriate length of the period for finding out search behavior may be 1 month. Alternatively, the length of the appropriate period may be one week. The operator OP may want to set an appropriate period for analyzing search behavior as each period in order to extract useful information (for example, relativity between search behavior) from the list of search queries. If the length of each period is not appropriate (for example, the length of each period is one year), the operator OP may not be able to appropriately find out the transition mode of categories of users. If the length of the period changes, the ranking of the relevance degrees between the reference query and the search queries also changes. For example, if the length of each period is too short, the list of search queries may include many buzzwords (in other words, words which have been popular topics in a particular period). In such a case, the operator OP may not be able to find out the change of the search queries related to the reference query from the list of search queries.

Therefore, the information providing device 100 specifies an appropriate length of the period by adjusting the length of the period. The information providing device 100 adjusts the density of search-query time series by using the above described element groups of the search queries.

Figure 3:
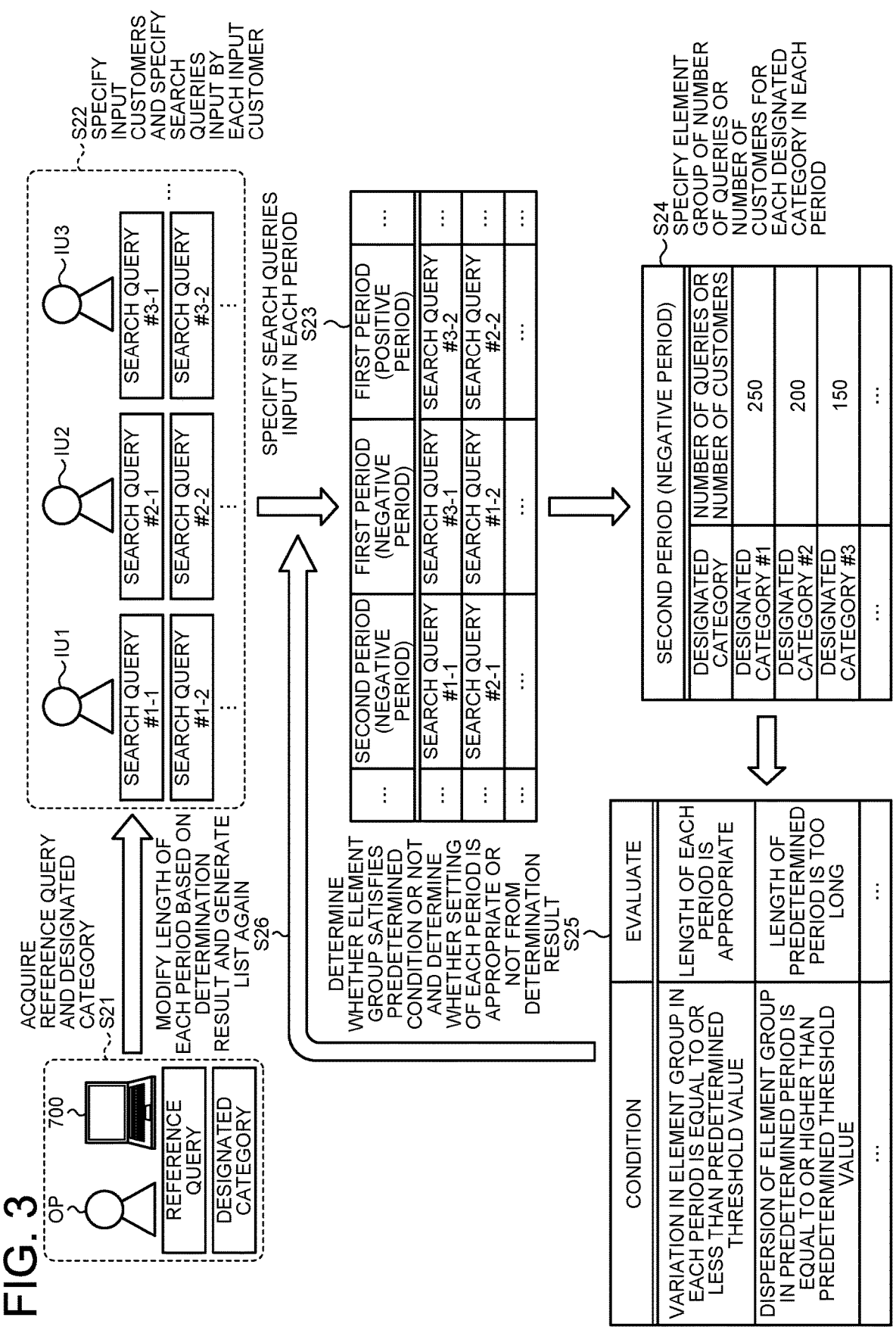
FIG. 3 is an explanatory diagram illustrating an example of a time-interval modifying process of modifying the time interval of the search-query time series according to the exemplary embodiment of the present disclosure.

FIG. 3 is an explanatory diagram illustrating an example of a time-interval modifying process of modifying the time interval of the search-query time series according to the exemplary embodiment of the present disclosure.

Figure 4:
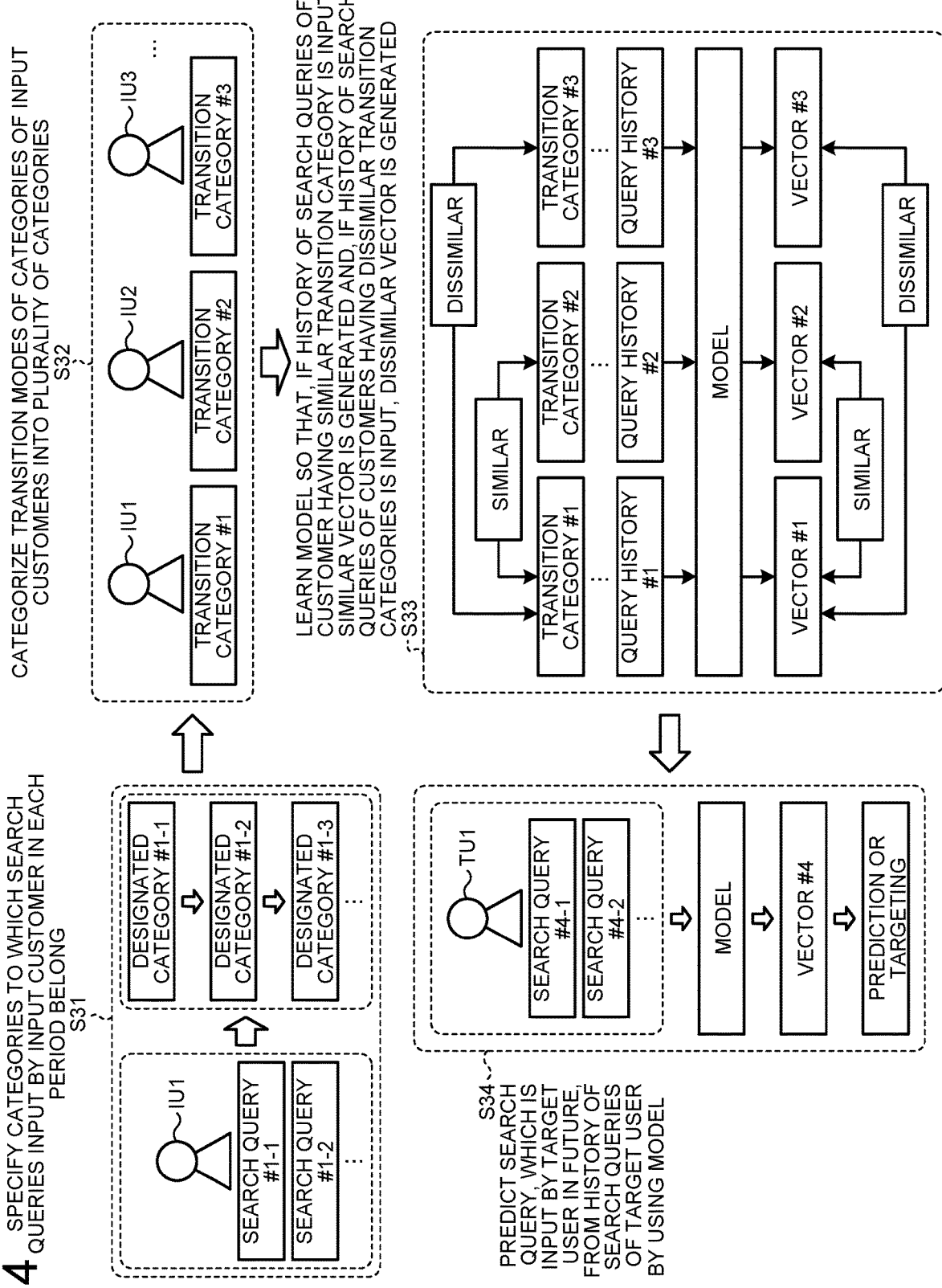
FIG. 4 is an explanatory diagram illustrating an example of a search-query predicting process of predicting a search query of a customer based on time-series data of search queries according to an exemplary embodiment of the present disclosure.

As illustrated in FIG. 4, first, as well as the above described case of step S11, the information providing device 100 acquires a reference query and designated categories from the operator device 700 (step S21). Then, as well as the above described case of step S12, the information providing device 100 specifies input customers and specifies the search queries input by each of the input customers (step S22). Then, as well as the above described case of step S13, the information providing device 100 specifies the search queries input in each period (step S23). Then, as well as the above described case of step S14, the information providing device 100 specifies an element group of the number of queries or the number of customers of each designated category in each period (step S24). Herein, redundant description is omitted.

Then, the information providing device 100 determines whether the element group satisfies a predetermined condition or not and determines whether the setting of each period is appropriate or not from the determination result (step S25). In the example of FIG. 3, the designated categories are fixed to particular categories. The particular category may be, for example, one of categories such as marriage, pregnancy, relocation, etc. Alternatively, the particular category may be one of the categories described above with reference to FIG. 2 such as company presidents, mascots, model change, amusement parks, comics, etc. The designated categories may be optimized by the above described grouping evaluation process. For example, in a case in which the reference query is a search query "newborn baby", the particular category may be a category such as marriage, pregnancy, or relocation. For example, a designated category #1 may be a category "marriage", a designated category #2 may be a category "pregnancy", and a designated category #3 may be a category "relocation".

In the example of FIG. 2, if variation in the element group in each period is equal to or less than a predetermined threshold value, the information providing device 100 determines that the length of each period is appropriate. For example, if the element groups are common among the periods, the information providing device 100 determines that the length of each period is appropriate. If the element group is shifted in a certain period, the information providing device 100 modifies the length of this period. If dispersion of the element group in a predetermined period is equal to or higher than a predetermined threshold value, the information providing device 100 determines that the length of the predetermined period is too long. In this manner, the information providing device 100 modifies periods so that the element groups are common among the periods.

If the type of the users who have input the search queries in each period satisfies a predetermined condition, the information providing device 100 may determine that the length of each period is appropriate. The type of the users is, for example, an attribute of the users such as a demographics attribute, a psychographics attribute, or the like. For example, the information providing device 100 may determine whether the length of each period is appropriate or not based on the male-to-female ratio of the input users who have input the reference query "newborn baby". If the length of a certain period changes, the male-to-female ratio of the input users in this period also changes. For example, the information providing device 100 may determine the change of the male-to-female ratio of the input users by changing the length of the period. For example, if the male-to-female ratio of the input users is one to one, the information providing device 100 may determine that the length of the period is appropriate. Note that the predetermined condition may be different in each period. Therefore, a plurality of periods (for example, first period, second period) may have different lengths.

Then, the information providing device 100 modifies the length of each period based on the determination result and generates a list again (step S26). For example, the information providing device 100 modifies the length of each period so that the type of the users who have input search queries in each period satisfies the predetermined condition. The information providing device 100 may provide various information to the operator OP based on the density of adjusted periods. For example, if the length of the adjusted period is short, the information providing device 100 may display, by the operator device 700, a message indicating that this period is important or changes in the behavior of users are intense in this period. For example, if the reference query is a search query "newborn baby", the length of the first period (negative period) (for example, period "−1 to 0 month") may be one week. This is for a reason that circumstances of users may largely change at the timing of childbirth. On the other hand, the length of a tenth period (negative period) (for example, period "−10 to −9 month") may be one month. This is for a reason that the circumstances of users do not change at the timing of pregnancy in some cases. In this manner, the length of each period can be determined based on whether the target shown by search queries are connected to important changes of the circumstances of the input users. A short period can be present at a hot point of search-query time series. The operator OP can find out important needs of users from the search queries at such a hot point.

As described above, the information providing device 100 can adjust an increment/decrement length of each period based on the above described reference time and date. The information providing device 100 may collect the conditions (for example, above described predetermined condition) for adjusting the increment/decrement length of each period from workers of crowdsourcing. The workers of crowdsourcing may be the input users who have input the reference query. For example, the predetermined condition collected from the workers of crowdsourcing may be a condition that "the length of each period is one month". As another example, the collected predetermined condition may be a condition that "the male-to-female ratio of input users is one to one".

1-4. Search-Query Predicting Process

In a case in which future search queries can be estimated from the history (for example, search logs) of search queries of users, buzzwords (in other words, words which have been popular topics in a particular period) may generate noise. Also, the search queries which have been input by users indicate specific targets such as a title of a comics on a certain magazine, an event name of an amusement park, etc. However, the targets desired to be grasped by the operator OP may be more abstract contexts. In some cases, the operator OP wants to find out behavior of users by more abstract context regardless of details of comics titles and event names.

For example, it is assumed that a user has input search queries, i.e., a search query "that devil (exemplary comics name)", a search query "that pirate (exemplary comics name)", and a search query "country of dreams and magic (exemplary name of facilities") in this order. Furthermore, it is assumed that another user has input search queries, i.e., a search query "that adventure (exemplary comics name)", a search query "that pirate (exemplary comics name)", and a search query "country of dreams and magic (exemplary name of facilities") in this order. In this example, that devil (exemplary comics name), that adventure (exemplary comics name), and that pirate (exemplary comics name) are on the same magazine. The users who are readers of this magazine may have a tendency to input the search query "country of dreams and magic (exemplary name of facilities)". For example, the user may have purchased this magazine to read that devil (exemplary comics name) and then got to like that pirate (exemplary comics name) on the magazine. This user may have been to the country of dreams and magic (exemplary name of facilities) where an event related to that pirate (exemplary comics name) is held. In such a case, a context from a comics on a magazine to amusement park via another comics on the magazine can be found. For example, the operator OP can find out that users who have input the search queries corresponding to one of a plurality of comics on a magazine tend to go to the country of dreams and magic (exemplary name of facilities).

Therefore, the information providing device 100 predicts a future search query(ies) by carrying out machine learning using search queries. More specifically, the information providing device 100 causes a machine learning model to learn characteristics of the above described path to the reference query. For example, the information providing device 100 causes the machine learning model to learn a mode of change of categories (for example, designated categories) corresponding to the search queries. The information providing device 100 inputs the search queries of a user to a learned model to estimate a search query(ies) to be input by the user. For example, the learned model can output a vector representing a mode of change of categories. Alternatively, the learned model can output a vector representing a reference query. The information providing device 100 can estimate a search query, which is input by the user, based on such a vector.

FIG. 4 is an explanatory diagram illustrating an example of a search-query predicting process of predicting a search query of a customer based on time-series data of search queries according to an exemplary embodiment of the present disclosure. Note that categories of search queries (for example, designated categories) may be optimized by the above described grouping evaluation process. Furthermore, each period based on the above described reference time and date may be optimized by the above described time-interval modifying process.

As illustrated in FIG. 4, first, the information providing device 100 specifies categories to which search queries input by input customers in each period belong (step S31). In the example of FIG. 4, the input customer IU1 inputs, for example, search queries such as a search query #1-1, a search query #1-2, and a search query #1-3. The search queries belong to the above described designated categories. If the search query #1-1, the search query #1-2, and the search query #1-3 correspond to a designated category #1-1, a designated category #1-2, and a designated category #1-3, respectively, the information providing device 100 determines that the input customer IU1 has input the search queries in the order of the designated category #1-1, the designated category #1-2, and the designated category #1-3. In this manner, the information providing device 100 categorizes the search queries, which have been input by the input customer in each period, into categories. Furthermore, the information providing device 100 specifies transition modes of categories (for example, designated categories).

Then, the information providing device 100 categorizes the transition modes of the categories of input customers into a plurality of categories (step S32). In the example of FIG. 4, the information providing device 100, for example, categorizes the transition mode of the plurality of designated categories respectively corresponding to the plurality of search queries input by the input customer IU1 into categories. For example, if the transition of the categories occur in the order of the designated category #1-1, the designated category #1-2, and the designated category #1-3 in this order, the transition of these categories is categorized into a transition category #1. More specifically, the information providing device 100 categorizes the transition mode of the categories of the input customer into a transition category corresponding to a path to the reference query.

Then, the information providing device 100 learns a model so that, if a history of search queries of a customer having a similar transition category is input, a similar vector is generated and, if a history of search queries of customers having a dissimilar transition categories is input, a dissimilar vector is generated (step S33). For example, the information providing device 100 groups users based on the search queries input in the past by the users who have input the reference query. In the example of FIG. 4, for example, groups are groups of transition categories such as the transition category #1, the transition category #2, and the transition category #3. Then, the information providing device 100 causes the model to learn characteristics of the change of the input search queries for each group. More specifically, the information providing device 100 causes the model to learn the characteristics of the change of the categories to which the search queries belong. In other words, the information providing device 100 groups users by the change categories of the categories and causes the model to learn the change of the search queries of the users.

In the example of FIG. 4, the input customer IU1 is categorized into a transition category #1. Also, the input customer IU2 is categorized into a transition category #2. The information providing device 100 can specify another transition category similar to a certain transition category by referencing a predetermined dictionary. For example, if the transition category #1 is related to the transition category #2 in the dictionary, the information providing device 100 can specify the transition category #2 as a category similar to the transition category #1.

In the example of FIG. 4, a query history #1 is a history of the search queries input by the input customers who have categorized into the transition category #1. Similarly, a query history #2 is a history of the search queries input by the input customers who have categorized into the transition category #2.

In the example of FIG. 4, a vector #1 is a vector representing a transition mode of categories. For example, the vector #1 represents the transition mode of the transition category #1. In other words, the vector #1 represents characteristics of the changes of the categories. For example, it is assumed that the transition category #1 corresponds to a transition mode in which the transition of categories occur in the order of a designated category "that magazine (exemplary magazine name), a designated category "that magazine (exemplary magazine name)", and a designated category "country of dreams and magic (exemplary name of facilities)". In this example, each element of the vector corresponds to the designated category. For example, first, second, third, fourth, and fifth elements respectively correspond to designated categories such as that magazine (exemplary magazine name), the country of dreams and magic (exemplary name of facilities), marriage, pregnancy, and relocation. In this case, the vector #1 may be (1,1,0,0,0). The first element "1" represents a fact that the transition of the category includes the designated category "that magazine (exemplary magazine name)". For example, the first element "1" represents a fact that the user has input a query such as that devil (exemplary comics name), that adventure (exemplary comics name), or that pirate (exemplary comics name). On the other hand, the fourth element "0" represents a fact that the transition of the category does not include a designated category "pregnancy". For example, the third element "0" represents a fact that the user has not input a query such as newborn baby.

The information providing device 100 carries out machine learning so that, even in a case in which a plurality of users inputs the same reference query, the model outputs different vectors if changes of categories are different. Therefore, the information providing device 100 can cause the model to accurately learn whether the user is the user who reaches the reference query or the characteristics of future search queries input by a certain user by using the search queries of the user or the categories of the search queries. As described above, the information providing device 100 specifies the categories to which the search queries input by the user in the past belong and carries out learning of the model for each type of change in the specified categories. For example, if the user inputs a search query "country of dreams and magic (exemplary name of facilities), the information providing device 100 can cause the model to learn the way how the user reaches this search query. In this manner, the information providing device 100 can cause the model to learn high-level concepts (for example, transition modes) of the categories of search queries.

Then, the information providing device 100 predicts a search query, which is input by a target user in the future, from the history of the search queries of the target user by using the model (step S34). In the example of FIG. 4, the information providing device 100 generates a vector #4 by inputting the history of the search queries (for example, a search query #4-1, a search query #4-2) of the target user TU1 to the learned model. The vector #4 represents the transition mode of the categories of the target user TU1. For example, the information providing device 100 can specify another target user corresponding to a vector similar to the generated vector #4 and carry out emphatic filtering based on the user information of the specified other target user. In this manner, the information providing device 100 can enable prediction of needs of the target user TU1 and/or targeting on the target user TU1. The above described group (for example, designated category) may correspond to particular marketing (for example, model change).

Hereinafter, the information providing device 100, which carries out such an information providing process, will be described in detail.

2. Information Providing System

Next, a configuration example of a system including the information providing device 100 will be described with reference to FIG. 5.

2-1. Constituent Elements of Information Providing System

Figure 5:
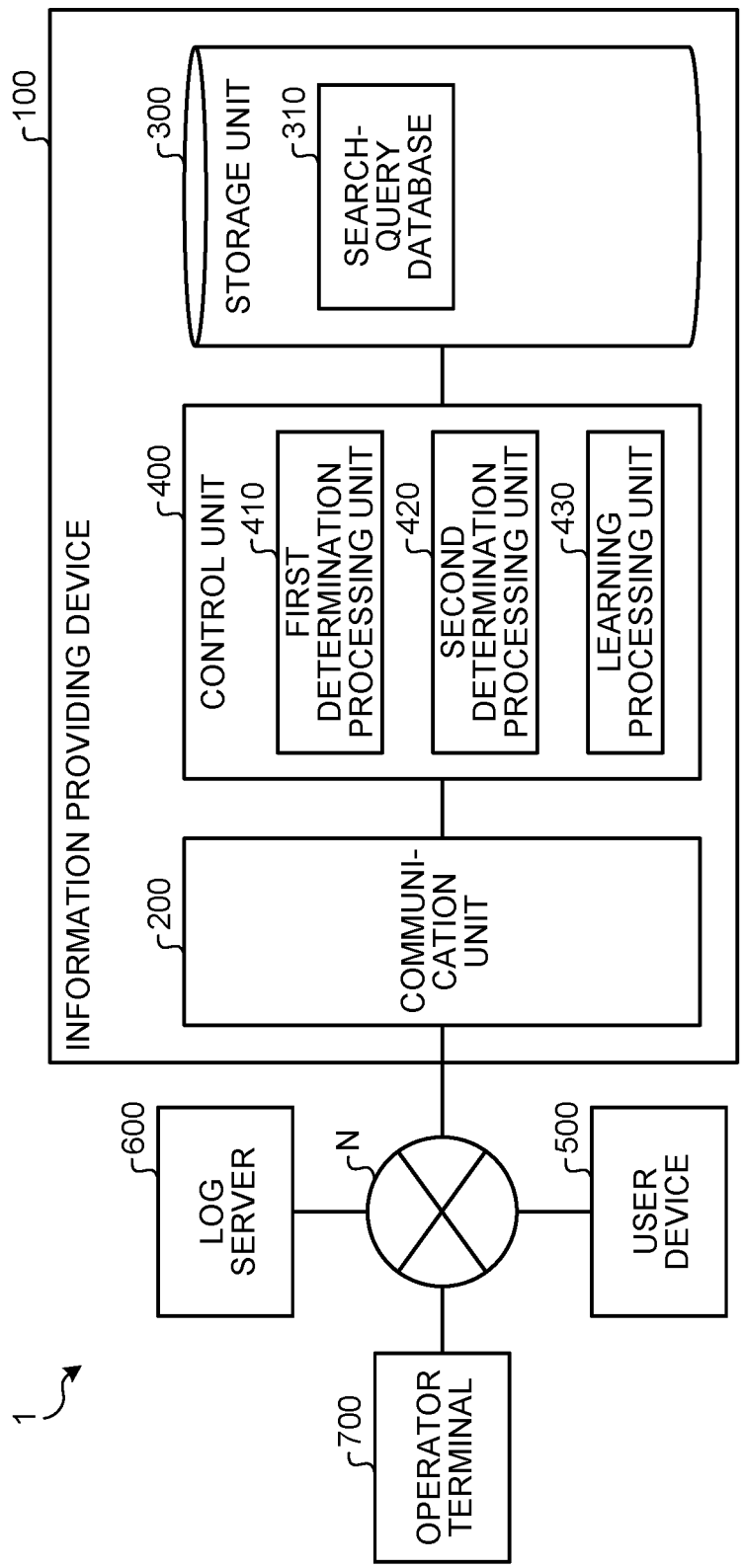
FIG. 5 is a diagram illustrating an example of an information providing system according to the embodiment.

FIG. 5 is a diagram illustrating an example of an information providing system 1 according to the embodiment. As illustrated in FIG. 5, the information providing system 1 includes constituent elements such as the information providing device 100, the user device 500, the log server 600, and the operator device 700. Although not illustrated in FIG. 1, the information providing system 1 may include a plurality of information providing devices 100, a plurality of user devices 500, a plurality of log servers 600, and/or a plurality of operator devices 700. Also, the information providing system 1 may include other constituent elements such as devices of entities (for example, business operators, end users) related to the information providing device 100.

In the information providing system 1, each of the information providing device 100, the user device 500, the log server 600, and the operator device 700 is connected to a network N by wire or wirelessly. The network N is, for example, a network such as the Internet, a WAN (Wide Area Network), or a LAN (Local Area Network). The constituent elements of the information providing system 1 can communicate with each other via the network N.

The information providing device 100 (corresponding to one example of the determination device) is an information processing device, which executes processing for evaluating time-series data of search queries. The information providing device 100 can find out users who have particular needs from the time-series data of search queries. Also, the information providing device 100 can predict needs of users from the time-series data of search queries. The information providing device 100 may be an information processing device of an arbitrary type including a server. The plurality of information providing devices 100 may provide functions of various servers such as a web server, an application server, and a database server, respectively. A configuration example of the information providing device 100 will be described in detail in a following section.

The user device 500 is an information processing device used by a user. The user device 500 can transmit search queries via various services (for example, portal site, portal application) on the Internet. Also, the user device 500 can receive search results via these various services. The user device 500 may be an information processing device of an arbitrary type including a client device such as a smartphone, a desk-top PC, a laptop PC, or a tablet PC.

The log server 600 is an information processing device, which provides various services (for example, portal site, portal application) on the Internet. The log server 600 can receive search queries from the user device 500 via these various services. Also, the log server 600 can accumulate the received search queries as search logs. The log server 600 may be an information processing device of an arbitrary type including a server.

The operator device 700 is an information processing device used by an operator. The operator is, for example, a person who is related to a particular Internet company related to the information providing device 100 or the log server 600. The operator device 700 enables the operator to input information to the information providing device 100. For example, if the operator wants to analyze time-series data, the operator can set a keyword or a category of an analysis target with respect to the information providing device 100. As well as the case of the user device 500, the operator device 700 may be an information processing device of an arbitrary type including a client device.

2-2. Configuration of Information Providing Device

As illustrated in FIG. 5, the information providing device 100 has a communication unit 200, a storage unit 300, and a control unit 400. Note that the information providing device 100 may have an input unit (for example, keyboard, mouse, or the like), which receives various operations from an administrator or the like who uses the information providing device 100 and a display unit (liquid crystal display or the like) for displaying various information.

Communication Unit 200

The communication unit 200 is realized, for example, by a Network Interface Card (NIC) or the like. The communication unit 200 is connected to a network by wire or wirelessly. The communication unit 200 may be communicably connected to the user device 500, the log server 600, and the operator device 700 via the network N. The communication unit 200 can carry out transmission/reception of information to/from the user device 500, the log server 600, and the operator device 700 via the network.

Storage Unit 300

The storage unit 300 is realized by, for example, a semiconductor memory element such as a Random Access Memory (RAM) or a flash memory (Flash Memory) or a storage device such as a hard disk or an optical disk. As illustrated in FIG. 5, the storage unit 300 has a search-query database 310.

Search-Query Database 310

Figure 6:
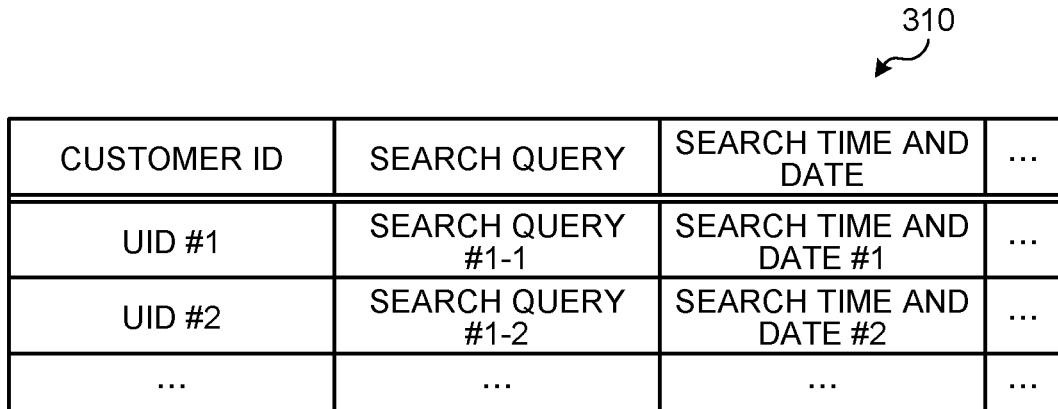
FIG. 6 is a diagram illustrating an example of a search-query database according to the embodiment.

FIG. 6 is a diagram illustrating an example of a search-query database 310 according to the embodiment. The search-query database 310 stores search queries input by users.

In the example of FIG. 6, the search-query database 310 has items such as "customer ID", "search query", and "search time and date". The search-query database 310 may be implemented as structured data sets such as search histories (for example, search logs).

The "customer ID" represents an identifier for identifying a user (also referred to as "customer"). The "search query" represents a search query input by the user. The "search time and date" represents time and date at which the search query is input.

For example, FIG. 6 illustrates a fact that a user identified by a customer ID "UID #1" has input a search query "search query #1-1". The customer ID "UID #1" is, for example, a predetermined character string. The search query "search query #1-1" is a character string such as "hospital stay", "ritual visit", and "weight".

Also, for example, FIG. 6 illustrates a fact that the search query "search query #1-1" has been input at time and date "search time and date #1". The time and date "search time and date #1" is, for example, a time stamp of "2020/03/19 12:00:00".

Control Unit 400

The control unit 400 is a controller and can be realized, for example, when a processor such as a Central Processing Unit (CPU) or a Micro Processing Unit (MPU) executes a various program(s) (corresponding to an example of a determination program), which is stored in a storage device in the information providing device 100, by using a RAM or the like a s a work area. Also, the control unit 400 is a controller and may be realized, for example, by an integrated circuit such as an Application Specific Integrated Circuit (ASIC), a Field Programmable Gate Array (FPGA), a General Purpose Graphic Processing Unit (GPGPU), or the like.

As illustrated in FIG. 5, the control unit 400 has a first determination processing unit 410, a second determination processing unit 420, and a learning processing unit 430 and realizes or executes functions or working of information processing described below. Also, the control unit 400 can realize the information providing process described above with reference to FIG. 1, FIG. 2, FIG. 3, and FIG. 4. One or a plurality of processors of the information providing device 100 can realize functions of control units in the control unit 400 by executing commands stored in one or a plurality of memories of the information providing device 100. Note that the internal configuration of the control unit 400 is not limited to the configuration illustrated in FIG. 5, and another configuration may be used as long as the configuration carries out later-described information processing. For example, the first determination processing unit 410 may carry out all or part of the information processing which is described later about the units other than the first determination processing unit 410.

First Determination Processing Unit 410

Figure 7:
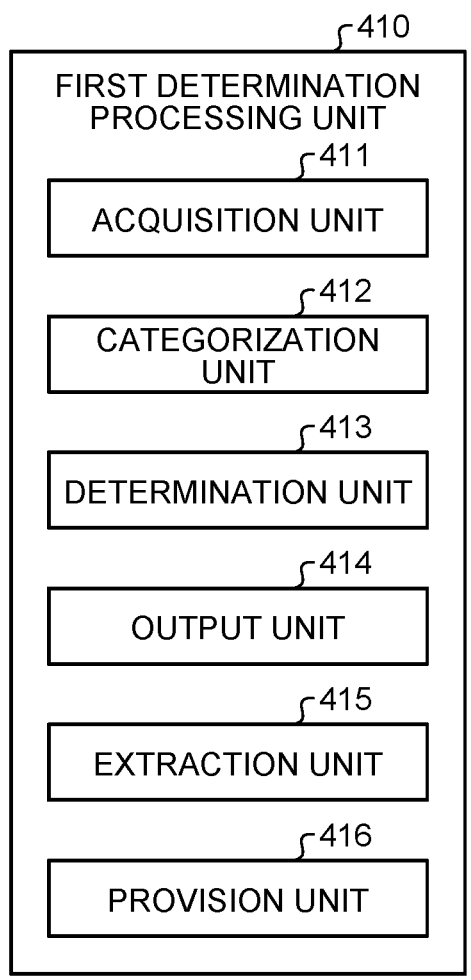
FIG. 7 is a diagram illustrating an example of a configuration of a first determination processing unit according to the embodiment.

FIG. 7 is a diagram illustrating an example of a configuration of the first determination processing unit 410 according to the embodiment. The first determination processing unit 410 can determine whether the categorization of the time-series search queries satisfies a predetermined condition or not. The categorization of the time-series search queries can be used for evaluating the time-series data of search queries.

As illustrated in FIG. 7, the first determination processing unit 410 has an acquisition unit 411, a categorization unit 412, a determination unit 413, an output unit 414, an extraction unit 415, and a provision unit 416. Note that the internal configuration of the first determination processing unit 410 is not limited to the configuration illustrated in FIG. 7, but may be another configuration as long as the configuration carries out the later-described information processing.

For example, the determination unit 413 may carry out all or part of the information processing described later about the units other than the determination unit 413.

For example, the first determination processing unit 410 groups the search queries, which have been input in each period by target users, in order to enable the operator to appropriately evaluate the list of the search queries. The first determination processing unit 410 can group the search queries, which have been input in each period, based on the context of the reference query. For example, the first determination processing unit 410 acquires the search logs of the users, who have input the reference query, for each time series (for example, period around the reference time and date). Then, the first determination processing unit 410 groups the search queries for each time series. For example, if the number of groups or the number of the users who have input the search queries related to groups satisfies a threshold value, the first determination processing unit 410 extracts the search queries related to the groups as the search queries included in the list. As a result, the grouped search queries included in the list can have coherence, thereby enabling the operator to appropriately evaluate the list of the search queries.

Acquisition Unit 411

The acquisition unit 411 can acquire various information used for evaluating the time-series data of search queries. The acquisition unit 411 can receive such various information from a predetermined information processing device (for example, a device of an entity related to the information providing device 100 (for example, a particular Internet company)). Also, for example, the acquisition unit 411 can receive such information from an administrator using the information providing device 100 via a user interface. The acquisition unit 411 may store received various information in the storage unit 300. For example, the acquisition unit 411 may store the received search queries in the search-query database 310. The acquisition unit 411 can acquire various information from the storage unit 300. For example, the acquisition unit 411 can acquire search queries (for example, search logs of search histories or the like) from the search-query database 310.

At least in one embodiment, the acquisition unit 411 acquires the search queries, which have been input by a plurality of input customers who have input the reference query.

At least in one embodiment, the acquisition unit 411 acquires the search queries which have been input in a period before the reference time and date, at which the input customer has input the reference query, by predetermined time and date as a predetermined period. For example, the acquisition unit 411 acquires the search queries, which have been input respectively in a plurality of different periods based on the reference time and date.

For example, the acquisition unit 411 acquires search logs from the log server 600. For example, the acquisition unit 411 collects histories of search queries from the log server 600.

For example, the acquisition unit 411 acquires a reference query from the operator device 700. As described above, the reference query is a predetermined search query input at certain time and date. As described above with reference to FIG. 1, the reference query is, for example, a query "newborn baby" input at certain time and date (for example, certain reference time and date).

For example, the acquisition unit 411 acquires a reference query and designated categories from the operator device 700. As described above, the reference query is a predetermined search query (for example, a search query "company C1") input at certain time and date. On the other hand, the designated categories are the categories for grouping the time-series search queries. The acquisition unit 411 groups the search queries for each time series (for example, the period around the reference time and date) in accordance with the designated categories. The designated categories are designated, for example, in advance by the operator. The designated categories are, for example, categories such as company presidents, mascots, model change, amusement parks, comics, and the like. In this manner, the acquisition unit 411 receives designated categories from the operator.

Categorization Unit 412

At least in one embodiment, the categorization unit 412 categorizes the search queries, which have been input in a predetermined period among search queries, into a plurality of categories.

At least in one embodiment, the categorization unit 412 categorizes the search queries into a plurality of categories for each period.

For example, the categorization unit 412 specifies the input customers who have input the reference query acquired by the acquisition unit 411. For example, the categorization unit 412 specifies the input customers, who have input the reference query, from the search logs acquired by the acquisition unit 411. As described above with reference to FIG. 1, the categorization unit 412 specifies, for example, a user who has input a search query "newborn baby" at certain time and date, as the input customer.

Then, the categorization unit 412 specifies the search queries, which have been input by the customers in each period based on the reference time and date. The periods based on the reference time and date are the periods around the reference time and date. For example, the interval of the periods may be one month. For example, in a case in which the reference time and date is "2020/03/19", the periods around the reference time and date are the periods after the reference time and date such as "2020/03/19 to 2020/04/19" and "2020/04/19 to 2020/05/19" or the periods before the reference time and date such as "2020/02/19 to 2020/03/19" and "2020/01/19 to 2020/02/19". In this manner, the categorization unit 412 extracts the search queries of the users, who have input the reference query, from the search logs acquired by the acquisition unit 411 in each period based on the reference time and date.

For example, the categorization unit 412 specifies input customers and specifies the search queries input by each input customer. As described above, the input customers are the users who have input the reference queries at the reference time and date. The categorization unit 412 can specify the input customers from search logs. Also, the categorization unit 412 can specify the search queries, which have been input in the periods around the reference time and date by the input customers, from the search logs. Then, the categorization unit 412 specifies the search queries input in each period. As described above, each period is a period around the reference time and date. Then, the categorization unit 412 specifies the element group of the number of queries or the number of customers of each designated category in each period. As described above with reference to FIG. 2, for example, the categorization unit 412 specifies the element group of the number of the search queries or the number of the users of each designated category in the second period (negative period). The categorization unit 412 can specify the element group of the search queries by counting the number of the search queries, which have been categorized into the designated categories, and the number of the customers who have input the search queries.

The categorization unit 412 may categorize the search queries into a plurality of categories for each period. The plurality of categories may include a designated category. More specifically, the categorization unit 412 may group the search queries for each time series in accordance with the categories other than the designated categories. If categories are not fixed in advance (for example, if the acquisition unit 411 has not acquired designated categories), the categorization unit 412 may categorize the search queries in the search logs into a plurality of categories (for example, categories other than designated categories) based on the reference query and the search logs. If the reference query is fixed in advance, the categorization unit 412 can search for a category appropriate for this reference query.

For example, the categorization unit 412 may automatically optimize categories (for example, designated category, the categories other than the designated category) based on the determination result of the determination unit 413.

Determination Unit 413

At least in one embodiment, the determination unit 413 determines whether the categorization result of the categorization unit 412 satisfies a predetermined determination condition or not.

At least in one embodiment, the determination unit 413 determines whether the number of the categories to which the search queries have been categorized satisfies a predetermined condition or not. For example, the determination unit 413 determines whether the number of the categories to which the search queries of predetermined percentage or higher among the search queries are categorized is equal to or less than a predetermined threshold value. Also, for example, the determination unit 413 specifies the category to which the search queries of predetermined percentage or higher among the search queries are categorized and determines whether the number of the customers who have input the search queries categorized to the specified category is equal to or higher than a predetermined threshold value or not.

At least in one embodiment, whether the categorization result satisfies the predetermined determination condition or not is determined for each period.

At least in one embodiment, the determination unit 413 determines whether the high-level categories to which the search queries are categorized satisfies a predetermined condition or not.

For example, the determination unit 413 determines whether the element group of search queries satisfies a predetermined condition or not and evaluates the reference query or the designated category from the determination result. The predetermined condition is, for example, a condition that "the number of the groups of search queries converges to a particular value (for example, a natural number n)". The groups are, for example, a plurality of categories including a designated category or a category other than the designated category. For example, if the percentage of the search queries belonging to n designated categories with respect to all queries in each period (in other words, all search logs in each period) satisfies a threshold value (for example, 80%) (for example, n is "3"), the determination unit 413 can use the n designated categories as the groups for the list of the search queries. For example, if the number of designated categories is "3" and if these three designated categories include 80% of search queries or customers, the determination unit 413 determines that these three designated categories satisfy the predetermined condition.

Regarding the number of the groups, if the number of the groups is large, the determination unit 413 can determine that the original reference query is not an appropriate query. If the number of groups in a certain period is equal to the number of groups in another period, the determination unit 413 can determine that the original reference query is an appropriate query. The determination unit 413 can determine whether the list of the search queries is appropriate or not based on whether the element group of the number of queries or the number of users is appropriately expressed or not. If the category is fixed in advance (for example, if the category is a designated category), the determination unit 413 can evaluate the element group of the number of queries or the number of users based on the categories and the search logs and, therefore, can specify an appropriate reference query.

As described above with reference to FIG. 2, the predetermined condition is, for example, a condition that "in any of the periods, the queries or the customers included in the designated category is 30% or less". If the element group of the search queries satisfies this condition, the determination unit 413 determines that the designated category is not appropriate or the reference query is not appropriate. In addition to or alternatively, the predetermined condition may be, for example, a condition that "variation in the percentage of the search queries or customers included in the designated category in each period exceeds a threshold value". If the element group satisfies this condition, the determination unit 413 determines that the designated category is not appropriate or the reference query is not appropriate. In this manner, the determination unit 413 can evaluate the reference query and the designated category by determining whether the element group of the search queries satisfies the predetermined condition or not. If the element group converges, the determination unit 413 can determine that the list of the search queries is appropriate.

As described above, the determination result is used for determining whether the reference query is appropriate or not. For example, if the reference query satisfies the predetermined condition in each period, the determination unit 413 determines that the reference query is appropriate. The determination unit 413 may determine that the reference query is appropriate if the reference query satisfies the condition in the majority of periods. If the reference query does not satisfy the predetermined condition in the periods, the reference query may not be appropriately expressing a desired target of the operator.

Output Unit 414

At least in one embodiment, if it is determined by the determination unit 413 that the categorization result satisfies a predetermined determination condition, the output unit 414 (for example, the output unit 414 implemented as a first output unit) outputs the information that the reference query is appropriate.

At least in one embodiment, if it is determined by the determination unit 413 that the categorization result satisfies a predetermined determination condition, the output unit 414 (for example, the output unit 414 implemented as a second output unit) outputs the information that the plurality of categories that categorizes the search queries is appropriate.

For example, the output unit 414 provides an evaluation result to the operator device 700. For example, the output unit 414 provides the information corresponding to the determination result to the operator. The output unit 414 may display, by the operator device 700, a message indicating that the designated category is not appropriate or the reference query is not appropriate. Alternatively, the output unit 414 may display, by the operator device 700, a message indicating that the search behavior of users is appropriately expressed by decomposing the time-series search queries into the element group of the category.

Extraction Unit 415

At least in one embodiment, if it is determined by the determination unit 413 that the categorization result satisfies a predetermined determination condition, the extraction unit 415 extracts the search queries categorized into a category, which satisfies a predetermined categorization condition among a plurality of categories. For example, the extraction unit 415 specifies the category to which the search queries of predetermined percentage or higher are categorized among search queries and extracts the search queries categorized to the specified category. Also, for example, the extraction unit 415 extracts the search queries having high relativity with the reference query among search queries.

For example, the extraction unit 415 acquires a search query, which satisfies a predetermined condition in each period and similar to the reference query, from the search-query database 310. The predetermined condition is, for example, a condition about the element group of search queries.

Provision Unit 416

At least in one embodiment, the provision unit 416 provides a list of search queries extracted by the extraction unit 415.

For example, the provision unit 416 generates a list of search queries having high relativity with the reference query for each period. As described above with reference to FIG. 1, the provision unit 416 specifies, from the search logs acquired by the acquisition unit 411, for example, search queries such as "hospital stay", "ritual visit", and "weight" as the search queries having high relativity with the reference query "newborn baby" one month before the reference time and date. Then, the provision unit 416 generates a list including the specified search queries.

Then, the provision unit 416 provides the generated list to the operator device 700. As described above with reference to FIG. 1, the generated list illustrates, for example, the search queries which have high relativity with the reference query "newborn baby" for each period. The provision unit 416 may generate a table in which other search queries input in each period are arranged in the order of relevance degrees and provide the generated table to the operator device 700 as a list.

For example, the provision unit 416 can provide a list that satisfies the conditions about the element groups of search queries to the operator device 700. The number (for example, "3") of arrays in a certain period may be the same number of arrays in another period. In this case, the operator can read transition modes of designated categories from the list. Such designated categories in each period can be paraphrased and applied to analysis of time-series search behavior.

Second Determination Processing Unit 420

Figure 8:
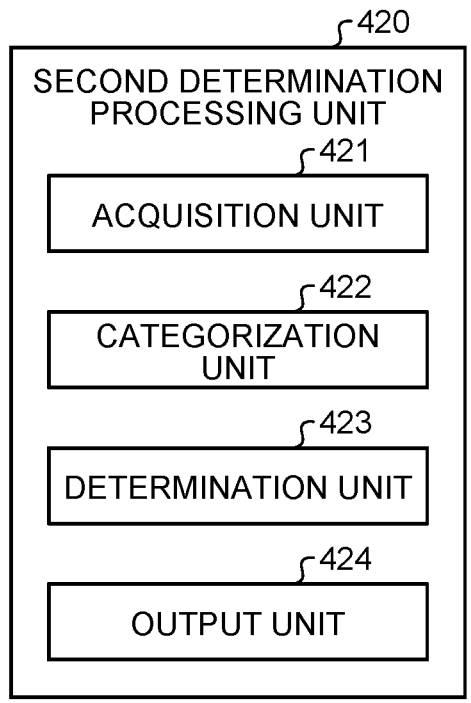
FIG. 8 is a diagram illustrating an example of a configuration of a second determination processing unit according to the embodiment.

FIG. 8 is a diagram illustrating an example of a configuration of the second determination processing unit 420 according to the embodiment. The second determination processing unit 420 can determine whether the period in the time series of search queries are appropriate or not. The period in the time series of search queries can be used for evaluating the time-series data of search queries.

As illustrated in FIG. 8, the second determination processing unit 420 has an acquisition unit 421, a categorization unit 422, a determination unit 423, and an output unit 424. Note that the internal configuration of the second determination processing unit 420 is not limited to the configuration illustrated in FIG. 8, but may be another configuration as long as the configuration carries out the later-described information processing. For example, the determination unit 423 may carry out all or part of the information processing described later about the units other than the determination unit 423.

For example, the second determination processing unit 420 specifies an appropriate length of the period by adjusting the length of the period. The second determination processing unit 420 adjusts the density of search-query time series by using the above described element groups of the search queries.

Acquisition Unit 421

The acquisition unit 421 can acquire various information used for evaluating the time-series data of search queries. The acquisition unit 421 can receive such various information from a predetermined information processing device (for example, a device of an entity related to the information providing device 100 (for example, a particular Internet company)). Also, for example, the acquisition unit 421 can receive such information from an administrator using the information providing device 100 via a user interface. The acquisition unit 421 may store received various information in the storage unit 300. For example, the acquisition unit 421 may store the received search queries in the search-query database 310. The acquisition unit 421 can acquire various information from the storage unit 300. For example, the acquisition unit 421 can acquire search queries (for example, search logs of search histories or the like) from the search-query database 310.

At least in one embodiment, the acquisition unit 421 acquires the search queries, which are the search queries input by a plurality of input customers who have input the reference query and input within a predetermined period.

At least in one embodiment, the acquisition unit 421 acquires search queries, which have been input by input customers in a plurality of different periods respectively based on the reference time and date at which reference query has been input.

For example, the acquisition unit 421 acquires search logs from the log server 600. For example, the acquisition unit 421 collects histories of search queries from the log server 600.

For example, the acquisition unit 421 acquires a reference query from the operator device 700. As described above, the reference query is a predetermined search query input at certain time and date. As described above with reference to FIG. 1, the reference query is, for example, a query "newborn baby" input at certain time and date (for example, certain reference time and date).

For example, the acquisition unit 421 acquires a reference query and designated categories from the operator device 700. As described above, the reference query is a predetermined search query (for example, a search query "company C1") input at certain time and date. On the other hand, the designated categories are the categories for grouping the time-series search queries. The acquisition unit 421 groups the search queries for each time series (for example, the period around the reference time and date) in accordance with the designated categories. The designated categories are designated, for example, in advance by the operator. The designated categories are, for example, categories such as company presidents, mascots, model change, amusement parks, comics, and the like. In this manner, the acquisition unit 421 receives designated categories from the operator.

For example, the acquisition unit 421 may collect the conditions (for example, above described predetermined condition) for adjusting the increment/decrement length of each period from workers of crowdsourcing. The workers of crowdsourcing may be the input users who have input the reference query. For example, the predetermined condition collected from the workers of crowdsourcing may be a condition that "the length of each period is one month". As another example, the collected predetermined condition may be a condition that "the male-to-female ratio of input users is one to one".

Categorization Unit 422

At least in one embodiment, the categorization unit 422 (for example, the categorization unit 422 implemented as a first categorization unit) categorizes the input customers, who have input search queries in a predetermined period, into a plurality of categories in accordance with the attributes of the input customers.

At least in one embodiment, the categorization unit 422 (for example, the categorization unit 422 implemented as a second categorization unit) categorizes the search queries, which have been input in a predetermined period, into a plurality of categories.

For example, the categorization unit 422 specifies the input customers who have input the reference query acquired by the acquisition unit 421. For example, the categorization unit 422 specifies the input customers, who have input the reference query, from the search logs acquired by the acquisition unit 421. As described above with reference to FIG. 1, the categorization unit 422 specifies, for example, a user who has input a search query "newborn baby" at certain time and date, as the input customer.

Then, the categorization unit 422 specifies the search queries, which have been input by the customers in each period based on the reference time and date. The periods based on the reference time and date are the periods around the reference time and date. For example, the interval of the periods may be one month. For example, in a case in which the reference time and date is "2020/03/19", the periods around the reference time and date are the periods after the reference time and date such as "2020/03/19 to 2020/04/19" and "2020/04/19 to 2020/05/19" or the periods before the reference time and date such as "2020/02/19 to 2020/03/19" and "2020/01/19 to 2020/02/19". In this manner, the categorization unit 422 extracts the search queries of the users, who have input the reference query, from the search logs acquired by the acquisition unit 421 in each period based on the reference time and date.

For example, the categorization unit 422 specifies input customers and specifies the search queries input by each input customer. As described above, the input customers are the users who have input the reference queries at the reference time and date. The categorization unit 422 can specify the input customers from search logs. Also, the categorization unit 422 can specify the search queries, which have been input in the periods around the reference time and date by the input customers, from the search logs. Then, the categorization unit 422 specifies the search queries input in each period. As described above, each period is a period around the reference time and date. Then, the categorization unit 422 specifies the element group of the number of queries or the number of customers of each designated category in each period. As described above with reference to FIG. 3, for example, the categorization unit 422 specifies the element group of the number of the search queries or the number of the users of each designated category in the second period (negative period). The categorization unit 422 can specify the element group of the search queries by counting the number of the search queries, which have been categorized into the designated categories, and the number of the customers who have input the search queries.

The categorization unit 422 may categorize the search queries into a plurality of categories for each period. The plurality of categories may include a designated category. More specifically, the categorization unit 422 may group the search queries for each time series in accordance with the categories other than the designated categories. If categories are not fixed in advance (for example, if the acquisition unit 421 has not acquired designated categories), the categorization unit 422 may categorize the search queries in the search logs into a plurality of categories (for example, categories other than designated categories) based on the reference query and the search logs. If the reference query is fixed in advance, the categorization unit 422 can search for a category appropriate for this reference query.

Determination Unit 423

At least in one embodiment, the determination unit 423 determines whether a predetermined period is appropriate or not based on the attributes of the input customers who have input search queries or based on whether these search queries satisfy predetermined conditions or not.

At least in one embodiment, the determination unit 423 determines whether the length of the predetermined period is appropriate or not.

At least in one embodiment, the determination unit 423 determines whether the predetermined period is appropriate or not based on whether the categorization result by the categorization unit 422 (for example, the categorization unit 422 implemented as a first categorization unit) satisfies a predetermined condition or not. For example, if the number of the categories to which the input customers are categorized is equal to or less than a predetermined threshold value, the determination unit 423 determines that the predetermined period is appropriate. Also, for example, if the percentage of the customers categorized into each category by the categorization unit 422 (for example, the categorization unit 422 implemented as the first categorization unit) satisfies a predetermined condition, the determination unit 423 determines that the predetermined period is appropriate.

At least in one embodiment, the determination unit 423 determines whether the predetermined period is appropriate or not based on whether the categorization result by the categorization unit 422 (for example, the categorization unit 422 implemented as a second categorization unit) satisfies a predetermined condition or not. For example, the determination unit 423 determines whether the number of the categories to which the search queries have been categorized satisfies a predetermined condition or not. For example, the determination unit 423 determines whether the number of the categories to which the search queries of predetermined percentage or higher among the search queries are categorized is equal to or less than a predetermined threshold value. For example, the determination unit 423 specifies the category to which the search queries of predetermined percentage or higher among the search queries are categorized and determines whether the number of the customers who have input the search queries categorized to the specified category is equal to or higher than a predetermined threshold value or not.

At least in one embodiment, whether this period is appropriate or not is determined for each period.

For example, the determination unit 423 determines whether the element group of search queries satisfies a predetermined condition or not and determines whether the setting of each period is appropriate or not from the determination result.

As described above with reference to FIG. 3, for example, if variation in the element group in each period is equal to or less than a predetermined threshold value, the determination unit 423 determines that the length of each period is appropriate. For example, if the element groups are common among the periods, the determination unit 423 determines that the length of each period is appropriate. If the element group is shifted in a certain period, the determination unit 423 modifies the length of this period. If dispersion of the element group in a predetermined period is equal to or higher than a predetermined threshold value, the determination unit 423 determines that the length of the predetermined period is too long. The determination unit 423 modifies periods so that the element groups are common among the periods.

If the type of the users who have input the search queries in each period satisfies a predetermined condition, the determination unit 423 may determine that the length of each period is appropriate. The type of the users is, for example, an attribute of the users such as a demographics attribute, a psychographics attribute, or the like. For example, the determination unit 423 may determine whether the length of each period is appropriate or not based on the male-to-female ratio of the input users who have input the reference query "newborn baby". If the length of a certain period changes, the male-to-female ratio of the input users in this period also changes. For example, the determination unit 423 may determine the change of the male-to-female ratio of the input users by changing the length of the period. For example, if the male-to-female ratio of the input users is one to one, the determination unit 423 may determine that the length of the period is appropriate. Note that the predetermined condition may be different in each period. Therefore, a plurality of periods (for example, first period, second period) may have different lengths.

Output Unit 424

If the determination unit 423 determines that the element group of search queries satisfies a predetermined condition, the output unit 424 can output the information that the setting of the period is appropriate.

For example, the output unit 424 modifies the length of each period based on the determination result and generates a list again. For example, the output unit 424 modifies the length of each period so that the type of the users who have input search queries in each period satisfies the predetermined condition. The output unit 424 may provide various information to the operator based on the density of adjusted periods. For example, if the length of the adjusted period is short, the output unit 424 may display, by the operator device 700, a message indicating that this period is important or changes in the behavior of users are intense in this period. For example, if the reference query is a search query "newborn baby", the length of the first period (negative period) (for example, period "−1 to 0 month") may be one week. This is for a reason that circumstances of users may largely change at the timing of childbirth. On the other hand, the length of a tenth period (negative period) (for example, period "−10 to −9 month") may be one month. This is for a reason that the circumstances of users do not change at the timing of pregnancy in some cases. In this manner, the length of each period can be determined based on whether the target shown by search queries are connected to important changes of the circumstances of the input users. A short period can be present at a hot point of search-query time series. The operator can find out important needs of users from the search queries at such a hot point.

Learning Processing Unit 430

Figure 9:
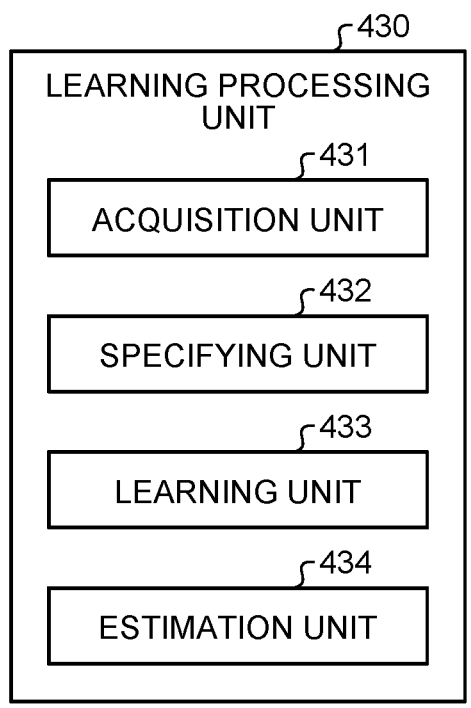
FIG. 9 is a diagram illustrating an example of a configuration of a learning processing unit according to the embodiment.

FIG. 9 is a diagram illustrating an example of a configuration of the learning processing unit 430 according to the embodiment. The learning processing unit 430 can learn the transition of the categories of search queries input by users from time-series data of the search queries. The learning from time-series data includes generation of a model from the time-series data. The process of generating a model from data may be referred to as training or learning. The model can be generated by training a machine learning algorithm by using training data.

The above described categories of the search queries may be the categorization of time-series search queries based on the determination by the above described first determination processing unit 410. For example, the time-series search queries may be categorized based on the determination executed by the first determination processing unit 410 whether the categorization of the time-series search queries satisfies a predetermined condition or not. The time-series search queries may be categorized so that the categorization of the time-series search queries satisfies a predetermined condition. As described above, such determination can be used for improving the categorization of time-series search queries.

The time interval of the above described transition may be the length of a period based on the determination by the above described second determination processing unit 420. For example, the length of the period in the time series of search queries may be determined based on the determination of whether the period in the time series of search queries is appropriate or not executed by the second determination processing unit 420. As described above, such determination can be used for improving the length of the period in the time series of search queries.

The above described transition of categories can be used for evaluating time-series data of search queries. As illustrated in FIG. 9, the learning processing unit 430 has an acquisition unit 431, a specifying unit 432, a learning unit 433, and an estimation unit 434. Note that the internal configuration of the learning processing unit 430 is not limited to the configuration illustrated in FIG. 9, but may be another configuration as long as the configuration carries out the later-described information processing. For example, the learning unit 433 may carry out all or part of the information processing described later about the units other than the learning unit 433.

For example, the learning processing unit 430 predicts a future search query(ies) by carrying out machine learning using search queries. More specifically, the learning processing unit 430 causes a machine learning model to learn characteristics of the above described path to the reference query. For example, the learning processing unit 430 causes the machine learning model to learn a mode of change of categories (for example, designated categories) corresponding to the search queries. The learning processing unit 430 inputs the search queries of a user to a learned model to estimate a search query(ies) to be input by the user. For example, the learned model can output a vector representing a mode of change of categories. Alternatively, the learned model can output a vector representing a reference query. The learning processing unit 430 can estimate a search query, which is input by the user, based on such a vector.

Acquisition Unit 431

The acquisition unit 431 can acquire various information used for evaluating the time-series data of search queries. The acquisition unit 431 can receive such various information from a predetermined information processing device (for example, a device of an entity related to the information providing device 100 (for example, a particular Internet company)). Also, for example, the acquisition unit 431 can receive such information from an administrator using the information providing device 100 via a user interface. The acquisition unit 431 may store received various information in the storage unit 300. For example, the acquisition unit 431 may store the received search queries in the search-query database 310. The acquisition unit 431 can acquire various information from the storage unit 300. For example, the acquisition unit 431 can acquire search queries (for example, search logs of search histories or the like) from the search-query database 310.

At least in one embodiment, the acquisition unit 431 acquires the search queries, which are the search queries input by a plurality of input customers who have input the reference query and input in mutually different periods.

At least in one embodiment, the acquisition unit 431 acquires a search query, which is input after the input customer inputs the reference query, as an objective query. For example, the acquisition unit 431 acquires a plurality of search queries, which are input after the input customer inputs the reference query, as objective queries.

For example, the acquisition unit 431 acquires search logs from the log server 600. For example, the acquisition unit 431 collects histories of search queries from the log server 600.

For example, the acquisition unit 431 acquires a reference query from the operator device 700. As described above, the reference query is a predetermined search query input at certain time and date. As described above with reference to FIG. 1, the reference query is, for example, a query "newborn baby" input at certain time and date (for example, certain reference time and date).

Specifying Unit 432

At least in one embodiment, the specifying unit 432 specifies the categories to which the search queries input in each period for each input customer.

For example, the specifying unit 432 specifies the input customers who have input the reference query acquired by the acquisition unit 431. For example, the specifying unit 432 specifies the input customers, who have input the reference query, from the search logs acquired by the acquisition unit 431. As described above with reference to FIG. 1, the specifying unit 432 specifies, for example, a user who has input a search query "newborn baby" at certain time and date, as the input customer.

Then, the specifying unit 432 specifies the search queries, which have been input by the customers in each period based on the reference time and date. The periods based on the reference time and date are the periods around the reference time and date. For example, the interval of the periods may be one month. For example, in a case in which the reference time and date is "2020/03/19", the periods around the reference time and date are the periods after the reference time and date such as "2020/03/19 to 2020/04/19" and "2020/04/19 to 2020/05/19" or the periods before the reference time and date such as "2020/02/19 to 2020/03/19" and "2020/01/19 to 2020/02/19". In this manner, the specifying unit 432 extracts the search queries of the users, who have input the reference query, from the search logs acquired by the acquisition unit 431 in each period based on the reference time and date.

For example, the specifying unit 432 specifies the categories to which the search queries input by the input customer in each period belong. As described above with reference to FIG. 4, the input customer IU1 inputs, for example, search queries such as a search query #1-1, a search query #1-2, and a search query #1-3. The search queries belong to the above described designated categories. If the search query #1-1, the search query #1-2, and the search query #1-3 correspond to a designated category #1-1, a designated category #1-2, and a designated category #1-3, respectively, the specifying unit 432 determines that the input customer IU1 has input the search queries in the order of the designated category #1-1, the designated category #1-2, and the designated category #1-3. In this manner, the specifying unit 432 categorizes the search queries, which have been input by the input customer in each period, into categories. Furthermore, the specifying unit 432 specifies transition modes of categories (for example, designated categories).

For example, the specifying unit 432 categorizes the transition modes of the categories of each input customer into a plurality of categories. As described above with reference to FIG. 4, the specifying unit 432, for example, categorizes the transition mode of the plurality of designated categories respectively corresponding to the plurality of search queries input by the input customer IU1 into categories. For example, if the transition of the categories occur in the order of the designated category #1-1, the designated category #1-2, and the designated category #1-3 in this order, the transition of these categories is categorized into a transition category #1. More specifically, the specifying unit 432 categorizes the transition mode of the categories of the input customer into a transition category corresponding to a path to the reference query.

Learning Unit 433

At least in one embodiment, the learning unit 433 causes a model to learn characteristics of changes in the categories specified by the specifying unit 432.

At least in one embodiment, the learning unit 433 carries out learning of a model so that objective queries are output when changes in the categories to which the search queries input by input customers are input. For example, the learning unit 433 carries out learning of a model so that objective queries are output in the input order when changes in the categories to which the search queries input by input customers are input.

At least in one embodiment, the learning unit 433 carries out learning of a model for each change of categories. For example, the learning unit 433 carries out learning of this model so that a search query input by an input customer after a reference query is output when search queries input by this input customer are input in the input order with respect to a model corresponding to changes in the categories to which the search queries input by this input customer belong.

At least in one embodiment, the learning unit 433 carries out learning of a model so that, a similar vector is output if a search query corresponding to a similar change in categories is input, and a dissimilar vector is output if a search query corresponding to a dissimilar change in categories is input.

At least in one embodiment, the learning unit 433 causes a model to learn the characteristics of changes in the categories of search queries input by an input customer on the way to a target corresponding to the reference query.

For example, the learning unit 433 learns a model so that, if a history of search queries of a customer having a similar transition category is input, a similar vector is generated and, if a history of search queries of customers having a dissimilar transition categories is input, a dissimilar vector is generated. For example, the learning unit 433 groups users based on the search queries input in the past by the users who have input the reference query. As described above with reference to FIG. 4, for example, groups are groups of transition categories such as the transition category #1, the transition category #2, and the transition category #3. Then, the learning unit 433 causes the model to learn characteristics of the change of the input search queries for each group. More specifically, the learning unit 433 causes the model to learn the characteristics of the change of the categories to which the search queries belong. In other words, the learning unit 433 groups users by the change categories of the categories and causes the model to learn the change of the search queries of the users.

As described above with reference to FIG. 4, for example, the input customer IU1 is categorized into the transition category #1. Also, the input customer IU2 is categorized into a transition category #2. The learning unit 433 can specify another transition category similar to a certain transition category by referencing a predetermined dictionary. For example, if the transition category #1 is related to the transition category #2 in the dictionary, the learning unit 433 can specify the transition category #2 as a category similar to the transition category #1.

The learning unit 433 carries out machine learning so that, even in a case in which a plurality of users inputs the same reference query, the model outputs different vectors if changes of categories are different. Therefore, the learning unit 433 can cause the model to accurately learn whether the user is the user who reaches the reference query or the characteristics of future search queries input by a certain user by using the search queries of the user or the categories of the search queries. As described above, the learning unit 433 specifies the categories to which the search queries input by the user in the past belong and carries out learning of the model for each type of change in the specified categories. For example, if the user inputs a search query "country of dreams and magic (exemplary name of facilities), the learning unit 433 can cause the model to learn the way how the user reaches this search query. In this manner, the learning unit 433 can cause the model to learn high-level concepts (for example, transition modes) of the categories of search queries.

Estimation Unit 434

At least in one embodiment, the estimation unit 434 estimates a search query, which is to be input in the future by a customer, by using a model learned by the learning unit 433 from changes in the categories to which the search queries input by this customer belong.

For example, the estimation unit 434 predicts a search query, which is to be input by a target user in the future, from the history of the search queries of the target user by using a model. As described above with reference to FIG. 4, the estimation unit 434 generates a vector #4 by inputting the history of the search queries (for example, a search query #4-1, a search query #4-2) of the target user TU1 to the learned model. The vector #4 represents the transition mode of the categories of the target user TU1. For example, the estimation unit 434 can specify another target user corresponding to a vector similar to the generated vector #4 and carry out emphatic filtering based on the user information of the specified other target user. In this manner, the estimation unit 434 can enable prediction of needs of the target user TU1 and/or targeting on the target user TU1. The above described group (for example, designated category) may correspond to particular marketing (for example, model change).

3. Flow of Category Determination Process

Then, with reference to FIG. 10, a procedure of a category determination process by the information providing device 100 according to the embodiment will be described.

Figure 10:
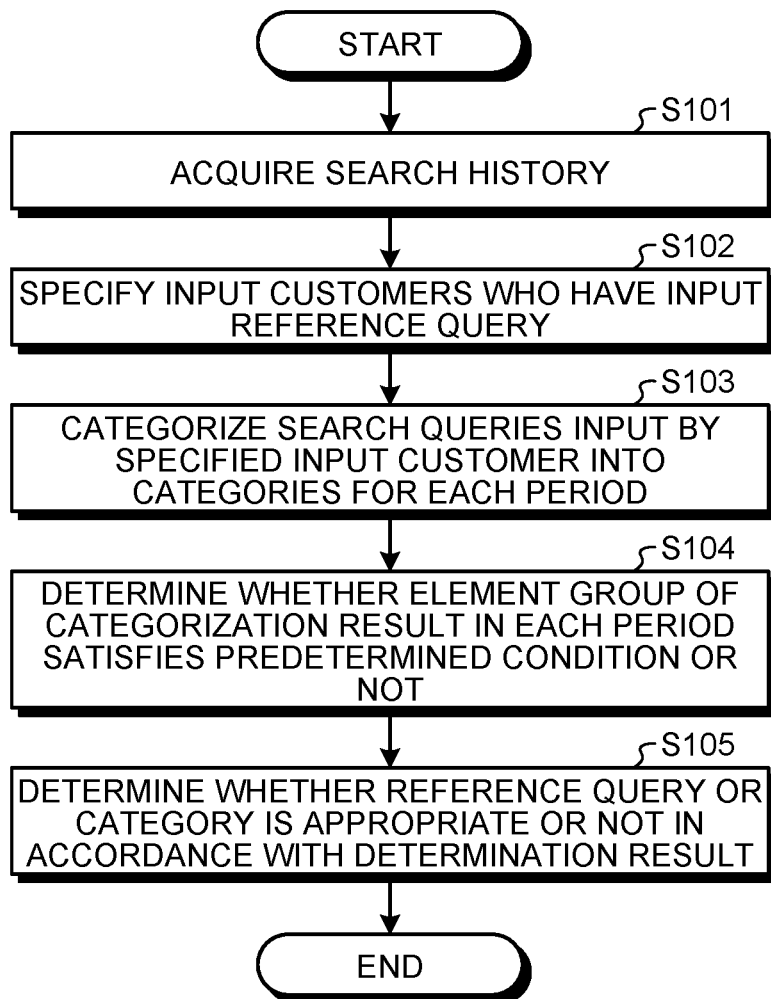
FIG. 10 is a flow chart illustrating an example of a process executed by an information providing device according to the embodiment for determining whether the categorization of keywords or search queries for categorizing customers is appropriate or not.

FIG. 10 is a flow chart illustrating an example of a process executed by the information providing device 100 according to the embodiment for determining whether the categorization of keywords or search queries for categorizing customers is appropriate or not.

As illustrated in FIG. 10, first, the first determination processing unit 410 (for example, acquisition unit 411) of the information providing device 100 acquires a search history from the search-query database 310 of the information providing device 100 (step S101).

Then, the first determination processing unit 410 (for example, acquisition unit 411) specifies the input customers who have input the reference query from the acquired search history (step S102).

Then, the first determination processing unit 410 (for example, the categorization unit 412) categorizes the search queries input by the specified input customer (for example, the input customer specified by the acquisition unit 411) into categories for each period (step S103).

Then, the first determination processing unit 410 (for example, the determination unit 413) determines whether the element group of the categorization result in each period (for example, the categorization result by the categorization unit 412 in each period) satisfies a predetermined condition or not (step S104).

Then, the first determination processing unit 410 (for example, the determination unit 413) determines whether the reference query or the category is appropriate or not in accordance with the determination result (step S105).

4. Flow of Period Determination Process

Then, with reference to FIG. 11, a procedure of a period determination process by the information providing device 100 according to the embodiment will be described.

Figure 11:
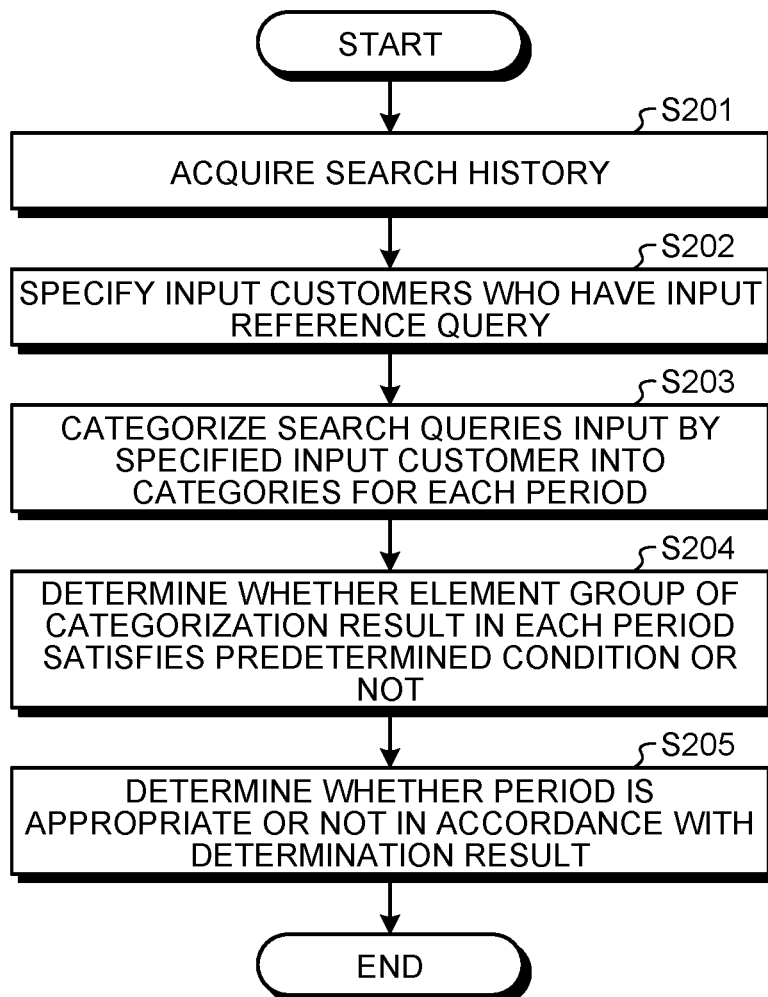
FIG. 11 is a flow chart illustrating an example of a process executed by the information providing device according to the embodiment for determining whether the period in the time series of search queries is appropriate or not.

FIG. 11 is a flow chart illustrating an example of a process executed by the information providing device 100 according to the embodiment for determining whether the period in the time series of search queries is appropriate or not.

As illustrated in FIG. 11, first, the second determination processing unit 420 (for example, acquisition unit 421) of the information providing device 100 acquires a search history from the search-query database 310 of the information providing device 100 (step S201).

Then, the second determination processing unit 420 (for example, acquisition unit 421) specifies the input customers who have input the reference query from the acquired search history (step S202).

Then, the second determination processing unit 420 (for example, the categorization unit 422) categorizes the search queries input by the specified input customer (for example, the input customer specified by the acquisition unit 421) into categories for each period (step S203).

Then, the second determination processing unit 420 (for example, the determination unit 423) determines whether the element group of the categorization result in each period (for example, the categorization result by the categorization unit 422 in each period) satisfies a predetermined condition or not (step S204).

Then, the second determination processing unit 420 (for example, the determination unit 423) determines whether the period is appropriate or not in accordance with the determination result (step S205).

5. Flow of Model Learning Process

Then, with reference to FIG. 12, a procedure of a model learning process by the information providing device 100 according to the embodiment will be described.

Figure 12:
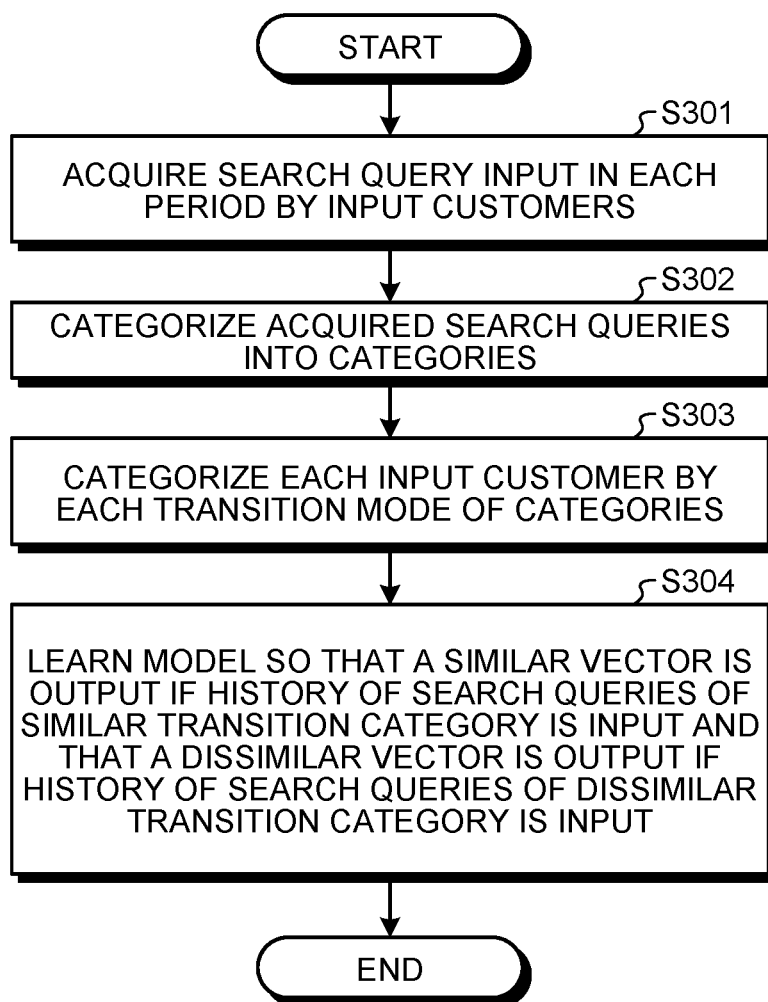
FIG. 12 is a flow chart illustrating an example of a process executed by the information providing device according to the embodiment for learning a model for predicting a transition of categories of search queries input by customers.

FIG. 12 is a flow chart illustrating an example of a process executed by the information providing device 100 according to the embodiment for learning a model for predicting a transition of categories of search queries input by customers.

As illustrated in FIG. 12, first, the learning processing unit 430 (for example, the acquisition unit 431) of the information providing device 100 acquires the search queries input in each period by input customers (step S301).

Then, the learning processing unit 430 (for example, the specifying unit 432) categorizes the acquired search queries (for example, the search queries acquired by the acquisition unit 431) into categories (step S302).

Then, the learning processing unit 430 (for example, the specifying unit 432) categorizes each input customer by each transition mode of categories (step S303). Each input customer is categorized into each transition category representing a transition mode of categories.

Then, the learning processing unit 430 (for example, the learning unit 433) learns a model so that a similar vector is output if a history of search queries of a similar transition category is input and that a dissimilar vector is output if a history of search queries of a dissimilar transition category is input (step S304).

6. Other Embodiments

The information providing device 100 according to the above described embodiment may be implemented by various other modes other than the above described embodiments. Therefore, hereinafter, other embodiments of the above described information providing device 100 will be described.

6-1. Expression of Designated Categories

The above described designated categories may be the categories indicating a path to a target represented by the reference query. For example, it is assumed that a user inputs the title of first comics on a first magazine as a search query in a period "−3 to −2 month", inputs the title of second comics on a second magazine as a search query in a period "−2 to −1 month", and inputs the title of third comics on a third magazine as a search query in a period "−1 to 0 month". Furthermore, it is assumed that another user inputs a first event name of a first amusement park as a search query in a period "−3 to −2 month", inputs a second event name of a second amusement park as a search query in a period "−2 to −1 month", and inputs a third event name of a third amusement park as a search query in a period "−1 to 0 month". In this example, the search query "the title of the first comics", the search query "the title of the second comics", and the search query "the title of the third comics" belong to a designated category "comics". The search query "the title of the first comics" does not have to belong to the designated category "first magazine", the search query "the title of the second comics" does not have to belong to a designated category "second magazine", and the search query "the title of the third comics" does not have to belong to a designated category "third magazine". More specifically, the designated categories may be higher-level categories (for example, comics, amusement parks) of normal categories (for example, the first magazine, the second magazine, the third magazine, the first amusement park, the second amusement park, and the third amusement park) for categorizing search queries.

The above described designated category "comics" can subject the path from the search query "the title of the first comics" to "the title of the third comics" via the search query "the title of the second comics" to coarse graining. Similarly, the above described designated category "amusement park" can subject the path from the search query "the first event name" to the "the third event name" via the search query "the second event name" to coarse graining. As described above, the first determination processing unit 410 (for example, the categorization unit 412) of the information providing device 100 can categorize search queries into any of a plurality of categories respectively corresponding to a plurality of paths to a target represented by the reference query for each period. Then, the first determination processing unit 410 (for example, the categorization unit 412) can determine whether the reference query or category (for example, designated category) is appropriate or not based on the categorization result.

6-2. Dispersion of Element Group of Search Queries

In the above described embodiments, if the element group of search queries converges, the first determination processing unit 410 (for example, the determination unit 413) of the information providing device 100 determines that the list of the search queries is appropriate, but the embodiment is not limited thereto. If the dispersion of the element group is high (for example, the element group is formed in a dispersed manner), it may be determined that the list of the search queries is appropriate. If dispersion of the element group is high, the completeness of the list of the search queries may be high. Such a list can be a list having a wide range of targets. For example, the list can include a keyword (for example, search query) in which many users are interested. On the other hand, if the dispersion of the element group is low, the list can include a keyword (for example, search query) in which particular target users are interested.

6-3. Prediction of Search Behavior by Machine Learning Model

In the above described embodiment, the learning processing unit 430 (for example, the learning unit 433) of the information providing device 100 carries out learning of a model so that the model outputs a vector representing a transition mode of categories, but the embodiment is not limited thereto. The learning processing unit 430 (for example, the learning unit 433) may predict a future search query from a particular time-series search history of a certain user by using a machine learning model, which has learned search histories of particular time series. Generally, a past behavior is a trigger of a future behavior. A future behavior may be caused by a plurality of past behaviors. In such machine learning, a search query input in a period before the reference time and date corresponds to an explanatory variable. On the other hand, a search query input in a period after the reference time and date corresponds to an objective variable. If a particular time-series search history of a user is input to a learned model, the learned model can estimate a future search query.

A plurality of search queries along time series may be converted into vectors in advance. As described above, for example, an embedding vector corresponding to a search query can be obtained by training various language expression models.

In some implementation modes, the learning processing unit 430 (for example, the learning unit 433) of the information providing device 100 may train a model architecture such as a series transformation model (Sequence To Sequence Model) by using training data including search logs. For example, the learning unit 433 can train a series transformation model by minimizing a negative logarithmic likelihood corresponding to the series transformation model by using training data including search logs. Examples of the series transformation model include a model having an attention mechanism such as a Transformer Model and a Recurrent Neural Network (RNN) (for example, gate-equipped RNN such as Long Short Term Memory (LSTM)). Instances included in the training data are, for example, time-series search queries and time-series categories (in other words, transitions of categories). Labels related to the instances are, for example, search queries (for example, reference query) and categories (for example, designated categories). The learning unit 433 can predict a future search query or a future category by inputting time-series search queries to a trained series transformation model.

6-4. Targeting based on Time-Series Search Queries

In some embodiments, the first determination processing unit 410 or the second determination processing unit 420 of the information providing device 100 may have a specifying unit (not illustrated) which specifies a second search query, which is input before a first search query is input and is related to the first search query, as a keyword used in targeting based on the first search query among search queries. Regarding the learning processing unit 430 of the information providing device 100, the above described specifying unit 432 may be implemented as a first specifying unit. In this case, the above described specifying unit may be implemented as a second specifying unit in the learning processing unit 430.

The specifying unit specifies the second search query, which has relativity with the first search query input at certain time and date and has been input before the time and date, from time-series search queries. As described later, the specifying unit can use the specified second query for targeting based on the first search query.

The time-series search queries are, for example, search queries, which have been acquired by the acquisition unit 411 or the acquisition unit 421 and input by a plurality of input customers who have input the reference query. The first search query may be the reference query or a search query other than the reference query.

For example, the second search query having the relativity with the first search query may be specified based on the above described relevance degrees between the search queries with reference to FIG. 1. As described above, the relevance degree between the search queries may be, for example, cosine similarity between the embedding vectors corresponding to the search queries. For example, if the relevance degree between the first search query and another search query satisfies a threshold value, the specifying unit may specify the other search query as the second search query. For example, if the first search query is "model change", the second search query may be a search query such as battery exchange, a billing plan, a packet fee, or the like. Alternatively, the second search query may be the search query described above with reference to FIG. 1 such as the company C1 (exemplary company name), the company president P1 (exemplary name of a person), that dog (exemplary mascot name), or the smartphone SP1 (exemplary smartphone name).

As another example, the second search query having relativity with the first search query may be specified based on the number of search queries or the number of users who have input search queries in a predetermined period before the first search query is input. For example, if the number of the search queries or the number of the users satisfies a threshold value, the specifying unit may specify these search queries as the second search query.

The targeting based on the first search query is the targeting of, for example, a trade target (for example, commercial product or service) corresponding to the first search query. The specifying unit can target the information about the trade target (for example, advertisement contents) on users. In other words, the targets of the advertisement contents are narrowed down to particular users. In some implementation modes, the storage unit 300 of the information providing device 100 may have a user database (not illustrated) which stores user information of the user of the user device 500. The specifying unit may process Structured Query Language (SQL) queries and specify the users who have input the second search query from the user database. Then, the specifying unit may provide the information about the trade target to the specified users.

As an example for explanation, it is assumed that the first search query is "model change". Furthermore, it is assumed that the second search query having relativity with the first search query is "battery exchange". In this example, the specifying unit can target the information about the trade target corresponding to the search query "model change" on the users who have input the search query "battery exchange". The specifying unit can provide various information about the model change (for example, information about a model change campaign, advertisement contents) via electronic mail accounts of the users, push notifications to the users, personal pages of the users, etc.

The specifying unit may provide the specified second query to the entities related to the information providing device 100 as advertisement targeting data (for example, targeting keyword). Also, the specifying unit may specify the users who have input the specified second query from the user database and categorize the specified users into a targeting group. The targeting group includes, for example, the information (for example, user ID) about the users who have input the second query. The specifying unit may provide the targeting group, which is associated with the second query, to the entities related to the information providing device 100 as advertisement targeting data.

7. Others

Also, among the processes described in the above described embodiments, some of the processes described to be automatically carried out can be also manually carried out. Alternatively, all or some of the processes described to be manually carried out may also be automatically carried out by a publicly known method. Other than that, the processing procedures illustrated in the above described document or drawings, specific names, and information including various data and parameters can be arbitrarily changed unless otherwise specifically stated. For example, the various information illustrated in the drawings is not limited to the illustrated information.

Also, each of the constituent elements of each illustrated device is a functional idea and is not necessarily required to be physically configured as the illustration. More specifically, the specific mode of the distribution/integration of each device is not limited to that of the illustration, and all or part thereof can be distributed/integrated functionally or physically in an arbitrary unit in accordance with various load, usage circumstances, etc.

For example, part or all of the storage unit 300 illustrated in FIG. 5 may be retained in a storage server or the like instead of being retained by the information providing device 100. In such a case, the information providing device 100 acquires various information such as search queries by accessing the storage server.

8. Hardware Configuration

Figure 13:
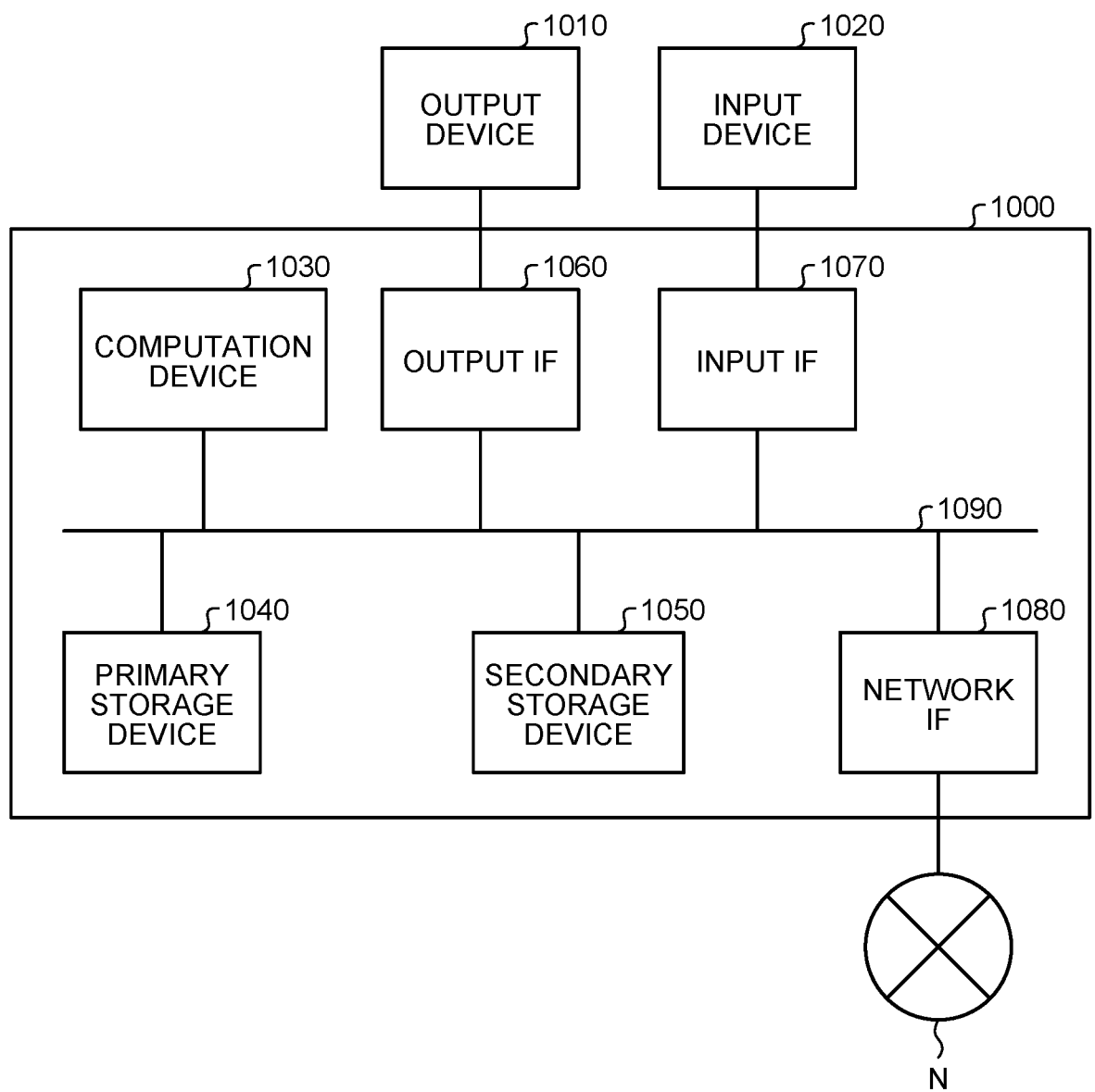
FIG. 13 is a diagram illustrating an example of a hardware configuration.

Also, the information providing device 100 according to the above described embodiment is realized, for example, by a computer 1000 having a configuration as illustrated in FIG. 13. FIG. 13 is a diagram illustrating an example of a hardware configuration. The computer 1000 is connected to an output device 1010 and an input device(s) 1020 and has a configuration in which a computation device 1030, a primary storage device 1040, a secondary storage device 1050, an output IF (Interface) 1060, an input IF 1070, and a network IF 1080 are connected by a bus 1090.

The computation device 1030 operates based on, for example, a program(s) stored in the primary storage device 1040 and/or the secondary storage device 1050 and/or a program(s) read from the input device 1020 and executes various processes. The primary storage device 1040 is a memory device such as a RAM, which temporarily stores data used by the computation device 1030 in various computation. Also, the secondary storage device 1050 is a storage device in which data used in various computation and various databases by the computation device 1030 are registered and is realized by a Read Only Memory (ROM), a Hard Disk Drive (HDD), a flash memory, or the like.

The output IF 1060 is an interface for transmitting information, which serves as an output target, to the output device 1010 such as a monitor or a printer, which outputs various information, and is realized, for example by a connector of standards such as a Universal Serial Bus (USB), a Digital Visual Interface (DVI), a High Definition Multimedia Interface (HDMI (registered tradename)). Also, the input IF 1070 is an interface for receiving information from the various input devices 1020 such as a mouse, a keyboard, and a scanner and is realized, for example, by a USB or the like.

Note that the input device 1020 may be a device which reads information from, for example, an optical recording medium such as a Compact Disc (CD), a Digital Versatile Disc (DVD), or a Phase change rewritable Disk (PD), a magnetooptical recording medium such as a Magneto-Optical disk (MO), a tape medium, a magnetic recording medium, or a semiconductor memory. Also, the input device 1020 may be an external storage medium such as a USB memory.

The network IF 1080 receives data from another equipment via a network N, transmits the data to the computation device 1030, and also transmits the data generated by the computation device 1030 to another equipment via the network N.

The computation device 1030 carries out control of the output device 1010 and the input device 1020 via the output IF 1060 and the input IF 1070. For example, the computation device 1030 loads the program from the input device 1020 or the secondary storage device 1050 to the primary storage device 1040 and executes the loaded program.

For example, if the computer 1000 functions as the information providing device 100, the computation device 1030 of the computer 1000 realizes the function of the control unit 400 by executing the program loaded to the primary storage device 1040.

9. Effects

As described above, the first determination processing unit 410 of the information providing device 100 according to the embodiment has the acquisition unit 411, the categorization unit 412, and the determination unit 413.

In the information providing device 100 according to the embodiment, the acquisition unit 411 acquires the search queries, which have been input by a plurality of input customers who have input the reference query. Also, in the information providing device 100 according to the embodiment, the categorization unit 412 categorizes the search queries, which have been input in a predetermined period among the search queries, into a plurality of categories. Also, in the information providing device 100 according to the embodiment, the determination unit 413 determines whether the categorization result by the categorization unit 412 satisfies a predetermined determination condition or not.

Also, in the information providing device 100 according to the embodiment, the determination unit 413 determines whether the number of the categories to which the search queries have been categorized satisfies a predetermined condition or not.

Also, in the information providing device 100 according to the embodiment, the determination unit 413 determines whether the number of the categories to which the search queries of predetermined percentage or higher among the search queries are categorized is equal to or less than a predetermined threshold value.

Also, in the information providing device 100 according to the embodiment, the determination unit 413 specifies the category to which the search queries of predetermined percentage or higher among the search queries are categorized and determines whether the number of the customers who have input the search queries categorized to the specified category is equal to or higher than a predetermined threshold value or not.

Also, in the information providing device 100 according to the embodiment, the acquisition unit 411 acquires the search queries which have been input in a period before the reference time and date, at which the input customer has input the reference query, by predetermined time and date as a predetermined period.

Also, in the information providing device 100 according to the embodiment, the acquisition unit 411 acquires the search queries, which have been input respectively in a plurality of different periods based on the reference time and date. Also, in the information providing device 100 according to the embodiment, the categorization unit 412 categorizes the search queries into a plurality of categories for each period. Also, in the information providing device 100 according to the embodiment, the determination unit 413 determines whether the categorization result satisfies a predetermined determination condition or not for each period.

Also, in the information providing device 100 according to the embodiment, the determination unit 413 determines whether the high-level categories to which the categories to which the search queries have been categorized satisfies a predetermined condition or not.

Also, the first determination processing unit 410 of the information providing device 100 according to the embodiment has the output unit 414 (for example, the output unit 414 implemented as a first output unit), which outputs the information that the reference query is appropriate if it is determined by the determination unit 413 that the categorization result satisfies the predetermined condition.

Also, the first determination processing unit 410 of the information providing device 100 according to the embodiment has the output unit 414 (for example, the output unit 414 implemented as a second output unit), which outputs the information that the plurality of categories, which categorizes the search queries, is appropriate if it is determined by the determination unit 413 that the categorization result satisfies the predetermined determination condition.

Also, the first determination processing unit 410 of the information providing device 100 according to the embodiment has the extraction unit 415 which, if it is determined by the determination unit 413 that the categorization result satisfies a predetermined determination condition, extracts the search queries categorized into a category, which satisfies a predetermined categorization condition among a plurality of categories. Also, the first determination processing unit 410 of the information providing device 100 according to the embodiment has the provision unit 416, which provides a list of the search queries extracted by the extraction unit 415.

Also, in the information providing device 100 according to the embodiment, the extraction unit 415 specifies the category to which the search queries of predetermined percentage or higher are categorized among search queries and extracts the search queries categorized to the specified category.

Also, in the information providing device 100 according to the embodiment, the extraction unit 415 extracts the search queries having high relativity with the reference query among search queries.

The first determination processing unit 410 of the information providing device 100 according to the embodiment has the specifying unit which specifies a second search query, which is input before the first search query is input and is related to the first search query, as a keyword used in targeting based on the first search query among search queries.

By the above described processes, the information providing device 100 can more appropriately analyze the relation between a customer and a target indicated by a predetermined search query.

Hereinabove, some of the embodiments of the present application have been described in detail based on the drawings. However, these are examples, and, including the aspects described in the section of disclosure of the invention, the present invention can be carried out in other modes with various modifications and/or improvements based on the knowledge of the persons skilled in the art.

Also, the above described information providing device 100 may be realized by a plurality of server computers. Also, the configuration can be flexibly changed depending on the functions, for example, by invoking and realizing an external platform or the like by an Application Programming Interface (API), a network computing, or the like.

Also, the above described "part (section, module, unit)" can be replaced by "means", "circuit", or the like. For example, the acquisition unit can be replaced by an acquisition means or an acquisition circuit.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A determination device comprising:
a processor configured to:
acquire a search query(ies) input by a plurality of input customers who have input a reference query;
categorize the search queries input in a predetermined period among the search queries into a plurality of categories;
determine whether a categorization result of the categorization satisfies a predetermined determination condition or not;
extract a search query categorized into the category that satisfies a predetermined categorization condition among the plurality of categories if it is determined that the categorization result satisfies the predetermined determination condition; and
provide a list of the extracted search queries.

2. The determination device according to claim 1, wherein the processor is further configured to:
determine whether a number of the categories into which the search queries have been categorized satisfies a predetermined condition or not.

3. The determination device according to claim 2, wherein the processor is further configured to:
determine whether the number of the categories into which the search query of predetermined percentage or higher among the search queries are categorized is equal to or less than a threshold value.

4. The determination device according to claim 2, wherein the processor is further configured to:
specify the category into which the search query of predetermined percentage or higher among the search queries is categorized and
determine whether the number of the customer who have input the search query categorized into the specified category is equal to or higher than a predetermined threshold value.

5. The determination device according to claim 1, wherein the processor is further configured to:
acquire the search query input in a period before reference time and date, at which the input customer has input a reference query, by predetermined time and date as the predetermined period.

6. The determination device according to claim 5, wherein the processor is further configured to:
acquire the search query(ies) input in a mutually different plurality of periods based on the reference time and date;
categorize the search queries into the plurality of categories for each of the period; and
determine whether the categorization result satisfies the predetermined determination condition or not for each period.

7. The determination device according to claim 1, wherein the processor is further configured to:
determine whether a high-level category into which the category into which the search query is categorized satisfies a predetermined condition or not.

8. The determination device according to claim 1, wherein the processor is further configured to:
output information that the reference query is appropriate if it is determined that the categorization result satisfies the predetermined determination condition.

9. The determination device according to claim 1, wherein the processor is further configured to:
output information that the plurality of categories into which the search queries are categorized are appropriate if it is determined that the categorization result satisfies the predetermined determination condition.

10. The determination device according to claim 1, wherein the processor is further configured to:
specify the category into which the search query of predetermined percentage or higher is categorized among the search queries and extracts the search query categorized into the specified category.

11. The determination device according to claim 1, wherein the processor is further configured to:
extract the search query having high relativity with the reference query among the search queries.

12. The determination device according to claim 1, wherein the processor is further configured to:
specify, as a keyword used in targeting based on a first search query, a second search query input before the first search query is input and related to the first search query among the search queries.

13. A determination method executed by a determination device, the method including:
acquiring a search query(ies) input by a plurality of input customers who have input a reference query;
categorizing the search queries input in a predetermined period among the search queries into a plurality of categories;
determining whether a categorization result of the categorization satisfies a predetermined determination condition or not;
extracting a search query categorized into the category that satisfies a predetermined categorization condition among the plurality of categories if it is determined that the categorization result satisfies the predetermined determination condition; and
providing a list of the extracted search queries.

14. A non-transitory computer readable storage medium having a determination program thereon, the determination program causes a computer to perform:
acquiring a search query(ies) input by a plurality of input customers who have input a reference query;
categorizing the search queries input in a predetermined period among the search queries into a plurality of categories;
determining whether a categorization result of the categorization satisfies a predetermined determination condition or not;
extracting a search query categorized into the category that satisfies a predetermined categorization condition among the plurality of categories if it is determined that the categorization result satisfies the predetermined determination condition; and
providing a list of the extracted search queries.

* * * * *